United States Patent
Cha et al.

(10) Patent No.: US 11,736,169 B2
(45) Date of Patent: Aug. 22, 2023

(54) METHOD FOR REPORTING CHANNEL STATE INFORMATION AND DEVICE THEREFOR

(71) Applicant: LG ELECTRONICS INC., Seoul (KR)

(72) Inventors: Hyunsu Cha, Seoul (KR); Jonghyun Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 17/262,645

(22) PCT Filed: Jul. 23, 2019

(86) PCT No.: PCT/KR2019/009095
§ 371 (c)(1),
(2) Date: Jan. 22, 2021

(87) PCT Pub. No.: WO2020/022748
PCT Pub. Date: Jan. 30, 2020

(65) Prior Publication Data
US 2021/0306045 A1  Sep. 30, 2021

(30) Foreign Application Priority Data
Jul. 24, 2018 (KR) .................. 10-2018-0086239

(51) Int. Cl.
*H04B 7/06* (2006.01)
*H04B 17/318* (2015.01)
*H04L 5/00* (2006.01)

(52) U.S. Cl.
CPC ......... *H04B 7/0626* (2013.01); *H04B 7/0639* (2013.01); *H04B 17/318* (2015.01); *H04L 5/0051* (2013.01)

(58) Field of Classification Search
CPC .. H04B 7/0626; H04B 7/0639; H04B 17/318; H04B 7/0632; H04B 7/0024;
(Continued)

(56) References Cited

U.S. PATENT DOCUMENTS

| 2013/0286866 A1* | 10/2013 | Hammarwall | ........ | H04L 5/0057 370/252 |
| 2014/0044040 A1* | 2/2014 | Chen | ..................... | H04L 5/0094 370/328 |

(Continued)

FOREIGN PATENT DOCUMENTS

| EP | 3826197 A1 * | 5/2021 | ........... H04B 7/0632 |
| KR | 20150104556 | 9/2015 | |

(Continued)

OTHER PUBLICATIONS

PCT International Application No. PCT/KR2019/009095, International Search Report dated Nov. 25, 2019, 4 pages.
(Continued)

*Primary Examiner* — Huy D Vu
*Assistant Examiner* — Robert Ma
(74) *Attorney, Agent, or Firm* — Lee Hong Degerman Kang Waimey

(57) ABSTRACT

Disclosed is a method for reporting channel state information by a terminal in a wireless communication system. More particularly, the method is characterized by: receiving information relating to an integrated channel state information-reference signal (CSI-RS) resource set including a plurality of CSI-RS resource groups; receiving information relating to CSI reporting setting associated with the integrated CSI-RS resource set; and reporting CSI for the integrated CSI-RS resource set based on the CSI reporting setting, wherein each of the plurality of CSI-RS resource groups can includes a plurality of CSI-RS resources.

11 Claims, 22 Drawing Sheets

(58) Field of Classification Search
CPC ... H04L 5/0051; H04L 5/0057; H04L 5/0094; H04L 5/0048
See application file for complete search history.

(56) References Cited

U.S. PATENT DOCUMENTS

| | | | |
|---|---|---|---|
| 2018/0227031 A1* | 8/2018 | Guo | H04B 7/0626 |
| 2019/0372642 A1* | 12/2019 | Kakishima | H04L 5/0048 |
| 2021/0143870 A1* | 5/2021 | Faxér | H04B 7/0626 |

FOREIGN PATENT DOCUMENTS

| | | | | |
|---|---|---|---|---|
| KR | 101697199 | | 1/2017 | |
| KR | 101760026 | | 7/2017 | |
| WO | WO-2014079329 A1 * | 5/2014 | | H04B 7/024 |

OTHER PUBLICATIONS

Huawei et al., "Consideration on two-level configuration of CSI acquisition settings," R1-1700057, 3GPP TSG RAN WG1 NR Ad Hoc Meeting, Jan. 2017, 7 pages.
NTT Docomo, "Remaining Issues on CSI reporting," R1-1807144, 3GPP TSG RAN WG1 Meeting #93, May 2018, 12 pages.

* cited by examiner

FIG. 1
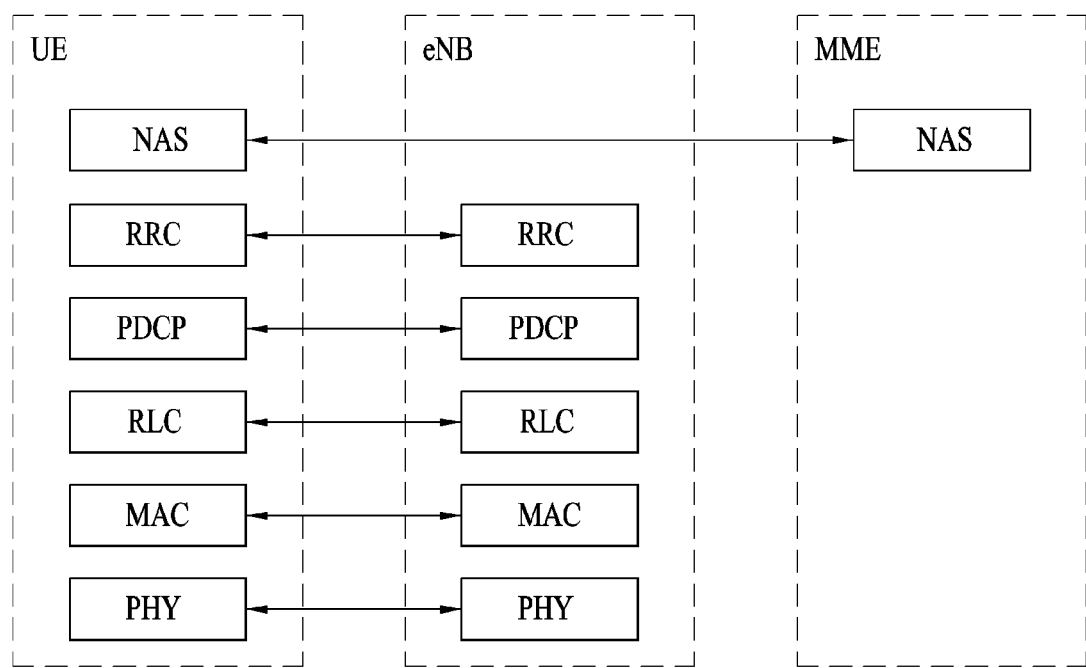
(A) CONTROL-PLANE PROTOCOL STACK
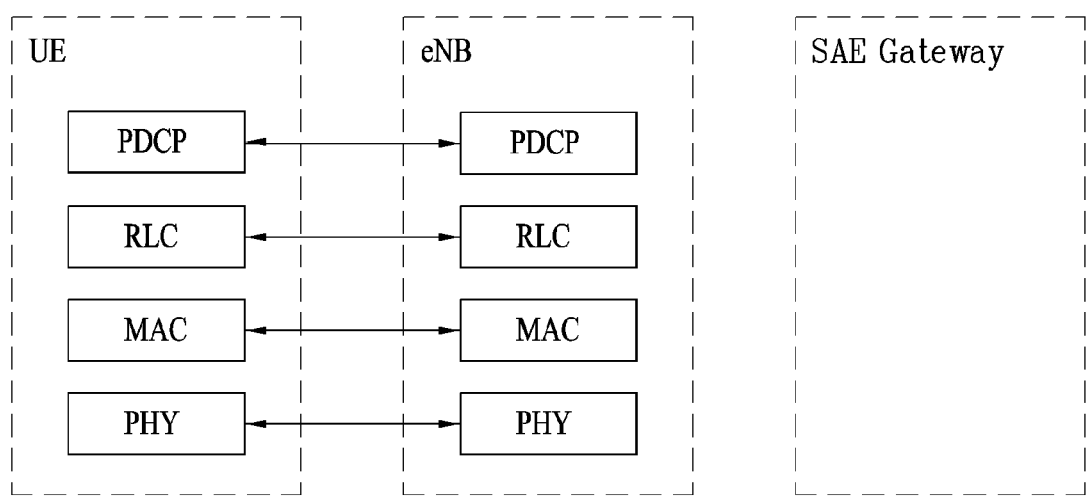
(B) USER-PLANE PROTOCOL STACK

FIG. 11
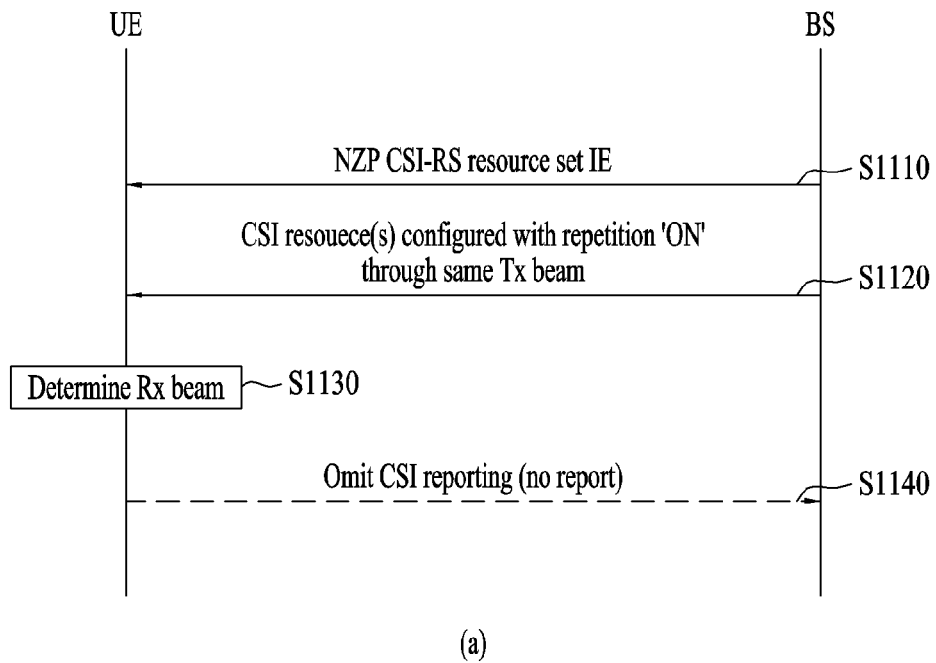
(a)
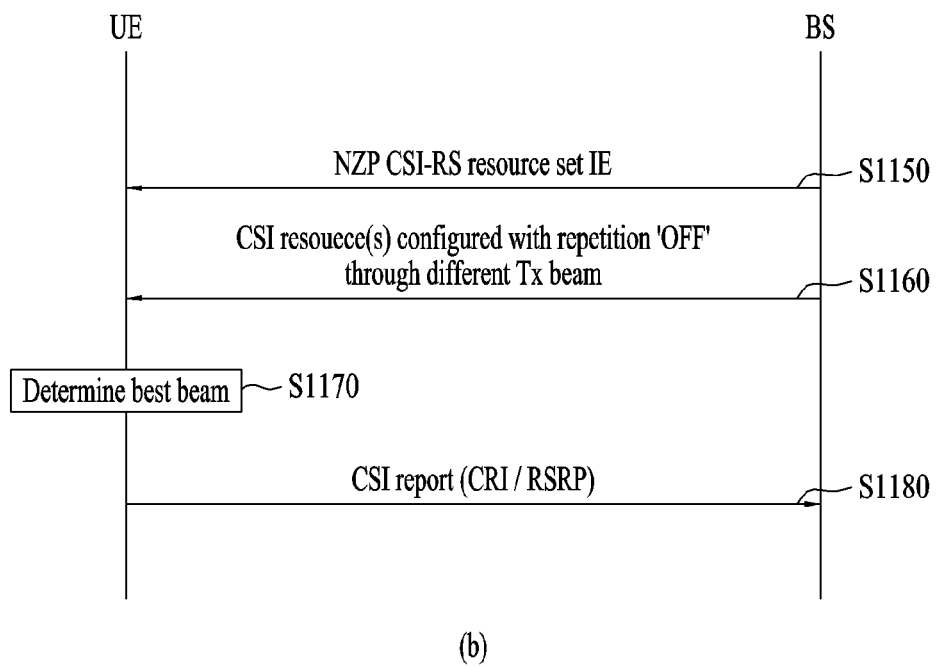
(b)

FIG. 17
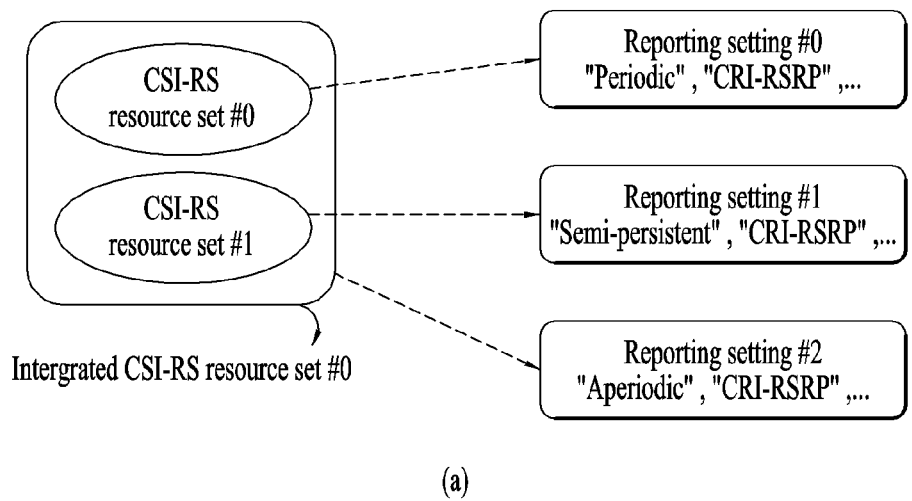
(a)
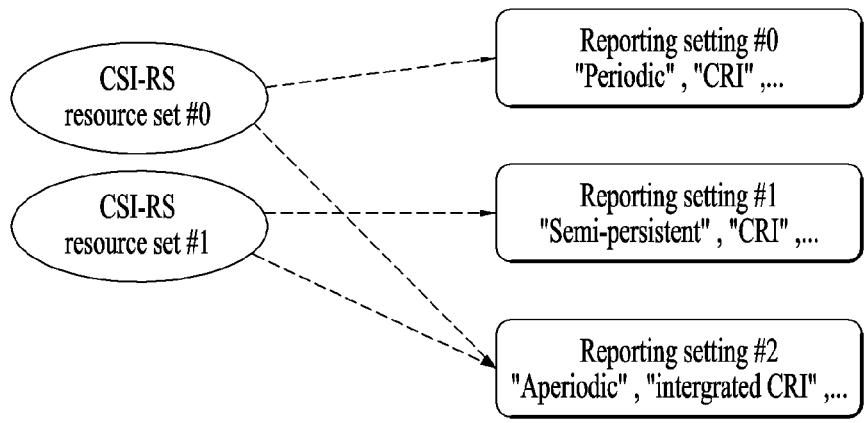
(b)

METHOD FOR REPORTING CHANNEL STATE INFORMATION AND DEVICE THEREFOR

CROSS-REFERENCE TO RELATED APPLICATIONS

This application is the National Stage filing under 35 U.S.C. 371 of International Application No. PCT/KR2019/009095, filed on Jul. 23, 2019, which claims the benefit of KR Application No. 10-2018-0086239, filed on Jul. 24, 2018, the contents of which is hereby incorporated by reference herein in its entirety.

TECHNICAL FIELD

The present disclosure relates to a method of reporting channel state information (CSI) and an apparatus therefor and, more particularly, to a method of reporting CSI about each of a CSI reference signal (CSI-RS) group and an integrated CSI-RS resource set by configuring a CSI reporting setting associated with the CSI-RS group including one or more CSI-RS resources and with the integrated CSI-RS resource set obtained by regrouping CSI-RS groups, and an apparatus therefor.

BACKGROUND ART

As more and more communication devices demand greater communication traffic along with current trends, a future-generation 5th generation (5G) system is required to provide enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DETAILED DESCRIPTION OF THE DISCLOSURE

Technical Problems

The present disclosure provides a method of reporting CSI and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to an aspect of the present disclosure, provided herein is a method of reporting channel state information (CSI) by a user equipment (UE) in a wireless communication system, including receiving information related to an integrated CSI-reference signal (RS) resource set including a plurality of CSI-RS resource groups, receiving information related to a CSI reporting setting associated with the integrated CSI-RS resource set, and reporting CSI for the integrated CSI-RS resource set based on the CSI reporting setting. Each of the plurality of CSI-RS resource groups may include a plurality of CSI-RS resources.

The plurality of CSI-RS resource groups may be respectively associated with at least one CSI-RS reporting setting, and CSI for the plurality of CSI-RS resource groups may be reported based on CSI-RS reporting settings associated respectively with the plural CSI-RS resource groups.

Each of the plurality of CSI-RS resource groups may be associated with a different base station (BS).

CSI-RS resource groups associated with BSs for which coordinated multiple point (CoMP) transmission is not scheduled among the plurality of CSI-RS resource groups may be used to measure a CSI-RS resource indicator (CRI) value and a reference signal received power (RSRP) value.

CSI-RS resource groups associated with BSs for which CoMP transmission is scheduled among the plurality of CSI-RS resource groups may be used to determine the CRI value, the RSRP value, and a precoding matrix indicator (PMI).

CSI-RS resource groups associated with the same CSI reporting setting may constitute one integrated CSI-RS resource set.

The UE may be communicable with at least one of another UE, a network, a base station (BS), or a self-driving vehicle.

According to another aspect of the present disclosure, an apparatus for reporting channel state information (CSI) in a wireless communication system includes at least one processor; and at least one memory operably connected to the at least one processor and configured to store instructions for causing the at least one processor to perform a specific operation based on execution of the at least one processor. The specific operation may include receiving information related to an integrated CSI-reference signal (RS) resource set including a plurality of CSI-RS resource groups, receiving information related to a CSI reporting setting associated with the integrated CSI-RS resource set, and reporting CSI for the integrated CSI-RS resource set based on the CSI reporting setting. Each of the plurality of CSI-RS resource groups may include a plurality of CSI-RS resources.

The plurality of CSI-RS resource groups may be respectively associated with at least one CSI-RS reporting setting, and CSI for the plurality of CSI-RS resource groups may be reported based on CSI-RS reporting settings associated respectively with the plural CSI-RS resource groups.

Each of the plurality of CSI-RS resource groups may be associated with a different base station (BS).

CSI-RS resource groups associated with BSs for which coordinated multiple point (CoMP) transmission is not scheduled among the plurality of CSI-RS resource groups may be used to measure a CSI-RS resource indicator (CRI) value and a reference signal received power (RSRP) value.

CSI-RS resource groups associated with BSs for which CoMP transmission is scheduled among the plurality of CSI-RS resource groups may be used to determine the CRI value, the RSRP value, and a precoding matrix indicator (PMI).

CSI-RS resource groups associated with the same CSI reporting setting may constitute one integrated CSI-RS resource set.

The apparatus may be communicable with at least one of a UE, a network, a BS, or a self-driving vehicle other than the apparatus.

According to another aspect of the present disclosure, a user equipment (UE) for reporting channel state information (CSI) in a wireless communication system includes at least one transceiver; at least one processor; and at least one memory operably connected to the at least one processor and configured to store instructions for causing the at least one processor to perform a specific operation based on execution of the at least one processor. The specific operation may include receiving, through the at least one transceiver, information related to an integrated CSI-reference signal (RS) resource set including a plurality of CSI-RS resource groups, receiving, through the at least one transceiver, information related to a CSI reporting setting associated with the integrated CSI-RS resource set, and reporting, through the at least one transceiver, CSI for the integrated CSI-RS resource set based on the CSI reporting setting. Each of the plurality of CSI-RS resource groups may include a plurality of CSI-RS resources.

Advantageous Effects

According to the present disclosure, a coordinated multipoint (CoMP) scheme may be efficiently performed even in a situation in which various heterogeneous networks are operated.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 1 is a diagram illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.

FIGS. 8, 9, 10, 11, and 12 are diagrams illustrating beam management in the NR system.

FIGS. 17 to 18 are diagrams illustrating an example of reporting CSI by associating a CSI reporting setting with a CSI-RS resource group and an integrated CSI-RS resource set according to an embodiment of the present disclosure.

BEST MODE FOR CARRYING OUT THE DISCLOSURE

Figure 2:
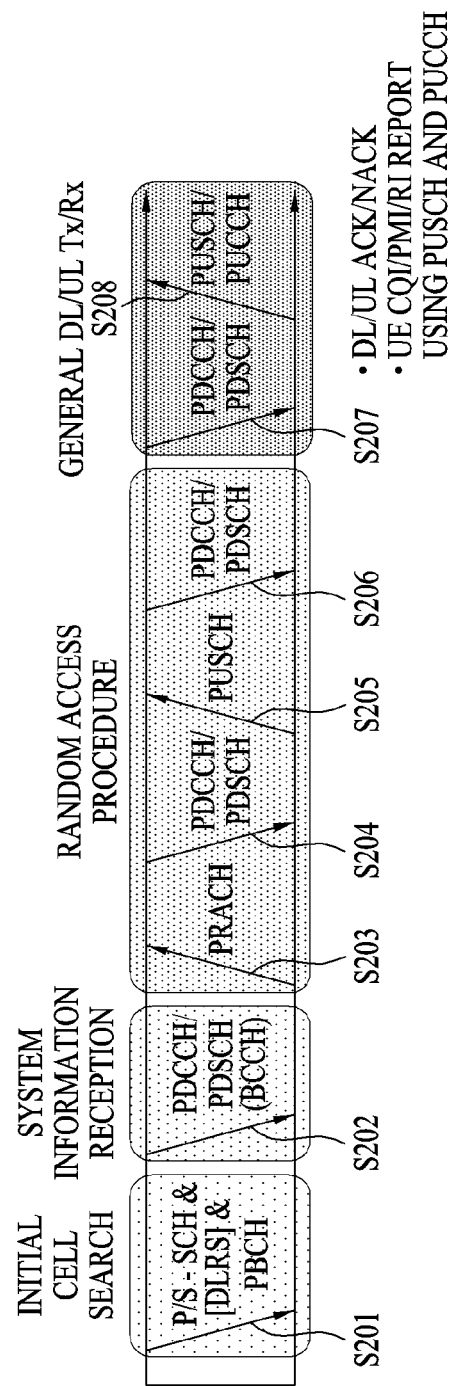
FIG. 2 is a diagram illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/

PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

<Artificial Intelligence (AI)>

AI refers to the field of studying AI or methodology for making the same, and machine learning refers to the field of defining various issues dealt with in the AI field and studying methodology for solving the various issues. The machine learning is defined as an algorithm that enhances the performance of a certain task through consistent experiences with the task.

An artificial neural network (ANN) is a model used in the machine learning and may mean a whole model of problem-solving ability which is composed of artificial neurons (nodes) that form a network by synaptic connections. The ANN may be defined by a connection pattern between neurons in different layers, a learning process for updating model parameters, and an activation function for generating an output value.

The ANN may include an input layer, an output layer, and optionally one or more hidden layers. Each layer includes one or more neurons, and the ANN may include a synapse that links neurons. In the ANN, each neuron may output the function value of the activation function for input signals, weights, and bias input through the synapse.

The model parameter refers to a parameter determined through learning and includes the weight value of a synaptic connection and the bias of a neuron. A hyperparameter means a parameter to be set in the machine learning algorithm before learning and includes a learning rate, a repetition number, a mini-batch size, and an initialization function.

The purpose of the learning of the ANN may be to determine the model parameter that minimizes a loss function. The loss function may be used as an index to determine the optimal model parameter in the learning process of the ANN.

Machine learning may be classified into supervised learning, unsupervised learning, and reinforcement learning according to learning mechanisms.

The supervised learning may refer to a method of training the ANN in a state that labels for learning data are given, and the label may mean a correct answer (or result value) that the ANN must infer when the learning data is input to the ANN. The unsupervised learning may refer to a method of training the ANN in a state that labels for learning data are not given. The reinforcement learning may refer to a method of learning an agent defined in a certain environment to select a behavior or a behavior sequence that maximizes cumulative compensation in each state.

Machine learning implemented with a deep neural network (DNN) including a plurality of hidden layers among ANNs is referred to as deep learning. The deep running is part of the machine running. The machine learning used herein includes the deep running.

<Robot>

A robot may refer to a machine that automatically processes or operates a given task based on its own ability. In particular, a robot having a function of recognizing an environment and making a self-determination may be referred to as an intelligent robot.

Robots may be classified into industrial robots, medical robots, home robots, military robots, etc. according to use purposes or fields.

The robot may include a driving unit having an actuator or a motor and perform various physical operations such as moving a robot joint. In addition, a movable robot may include a driving unit having a wheel, a brake, a propeller, etc. and may travel on the ground or fly in the air through the driving unit.

<Autonomous Driving (Self-Driving)>

Autonomous driving refers to a technique of driving by itself. An autonomous driving vehicle refers to a vehicle moving with no user manipulation or with minimum user manipulation.

For example, the autonomous driving may include a technology for maintaining a current lane, a technology for automatically adjusting a speed such as adaptive cruise control, a technique for automatically moving along a predetermined route, and a technology for automatically setting a route and traveling along the route when a destination is determined.

The vehicle may include a vehicle having only an internal combustion engine, a hybrid vehicle having an internal combustion engine and an electric motor together, and an electric vehicle having only an electric motor. Further, the vehicle may include not only an automobile but also a train, a motorcycle, etc.

The autonomous driving vehicle may be regarded as a robot having the autonomous driving function.

<Extended Reality (XR)>

Extended reality is collectively referred to as virtual reality (VR), augmented reality (AR), and mixed reality (MR). The VR technology provides real-world objects and backgrounds as CG images, the AR technology provides virtual CG images on real object images, and the MR technology is a computer graphic technology of mixing and combining virtual objects with the real world.

The MR technology is similar to the AR technology in that real and virtual objects are shown together. However, the MR technology is different from the AR technology in that the AR technology uses virtual objects to complement real objects, whereas the MR technology deal with virtual and real objects in the same way.

The XR technology may be applied to a HMD, a head-up display (HUD), a mobile phone, a tablet PC, a laptop computer, a desktop computer, a TV, a digital signage, etc. A device to which the XR technology is applied may be referred to as an XR device.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

When a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/

NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

Figure 3:
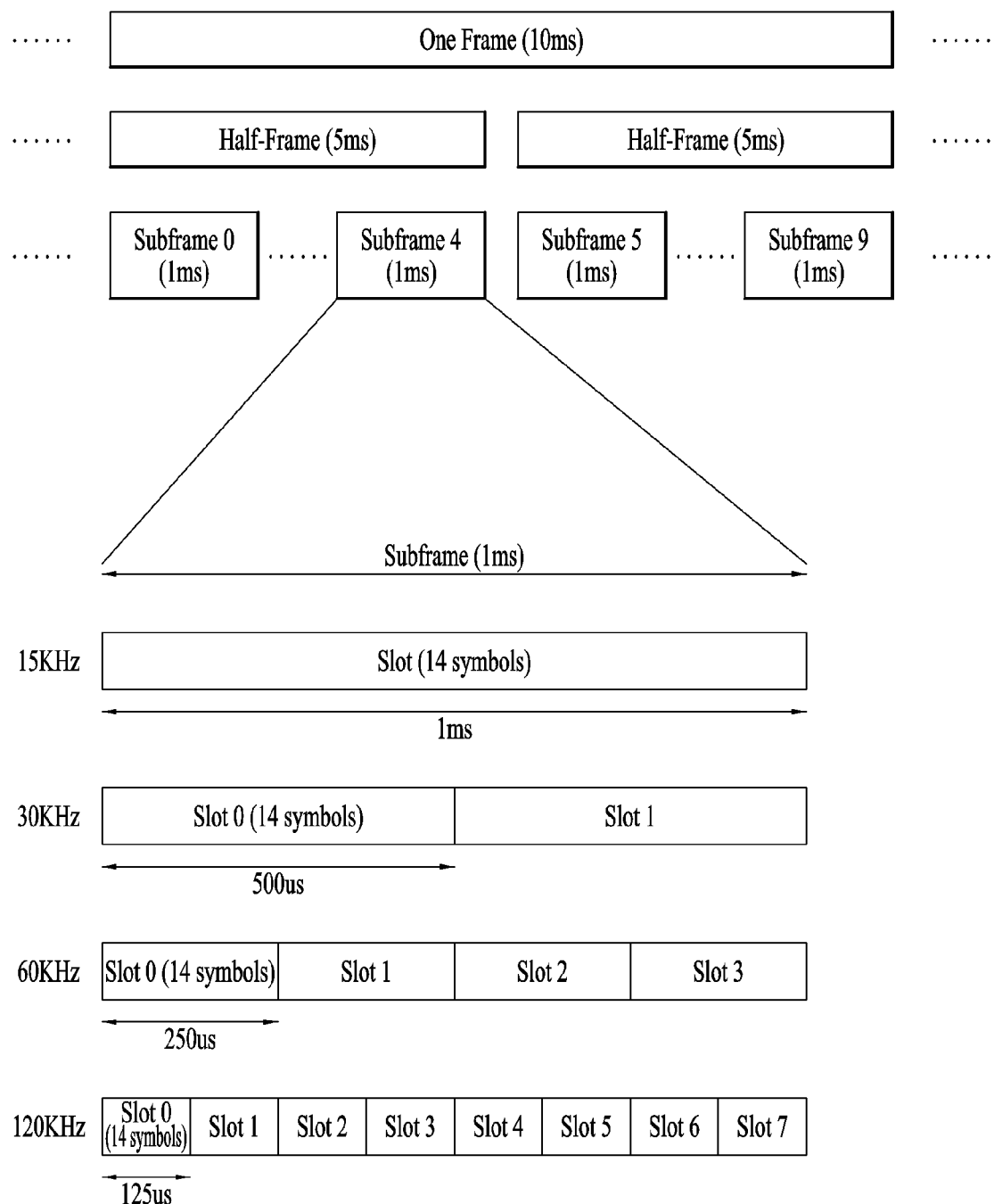
FIGS. 3, 4 and 5 are diagrams illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

Table 1 illustrates that the number of symbols per slot, the number of slots per frame, and the number of slots per subframe vary according to the SCS when the normal CP is used.

TABLE 1

| SCS (15 * 2^u) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N_{symb}^{slot}$: Number of symbols in a slot
* $N_{slot}^{frame,u}$: Number of slots in a frame
* $N_{slot}^{subframe,u}$: Number of slots in a subframe Table 2 illustrates that the number of symbols per slot, the number of slots per frame, and the number of slots per subframe vary according to the SCS when the extended CP is used.

TABLE 2

| SCS (15 * 2^u) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

Figure 4:
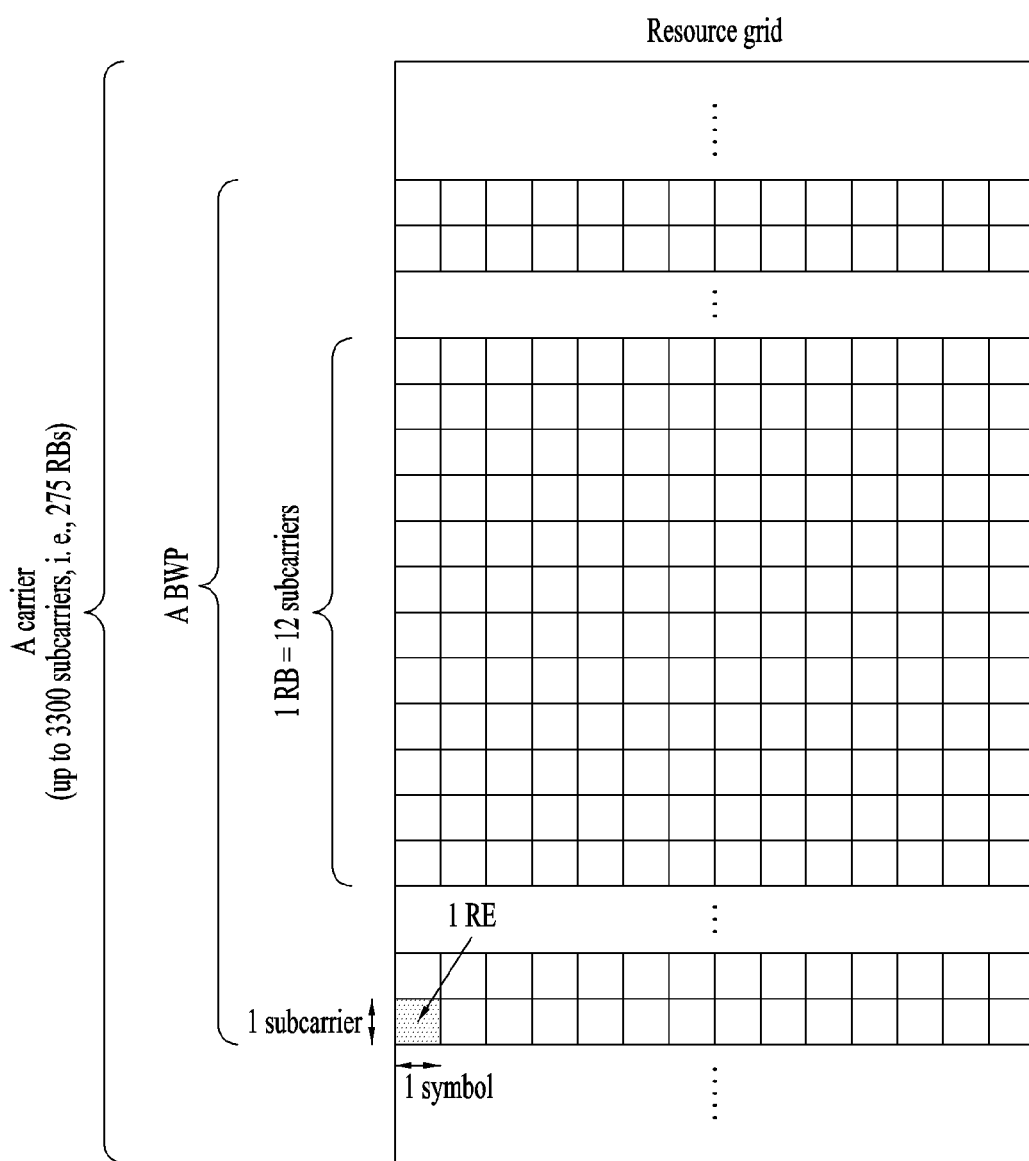

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells. FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 5:
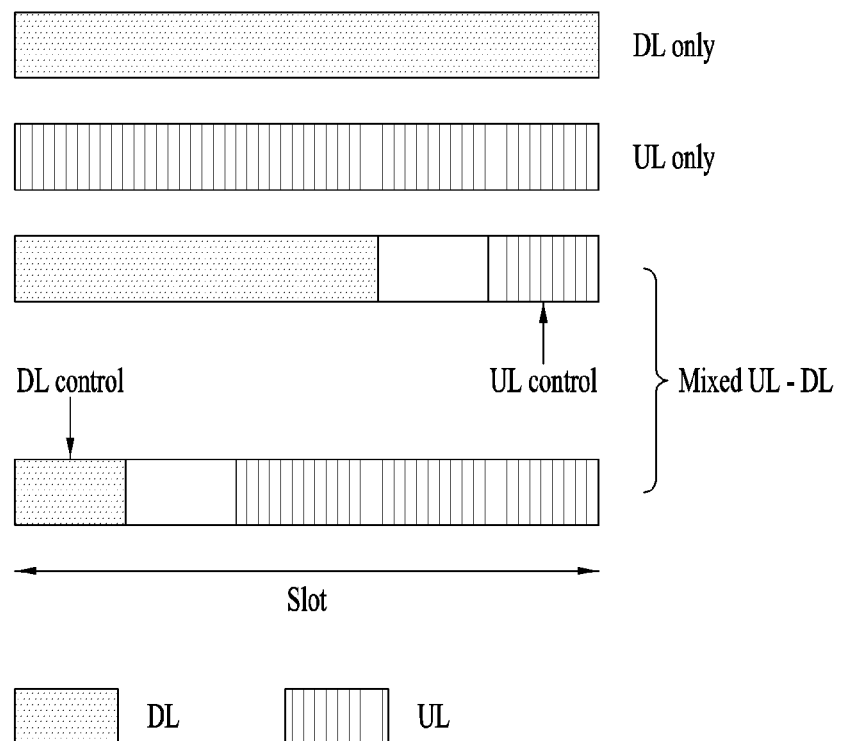

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Coordinated MultiPoint (CoMP) and CSI Process

Figure 6:
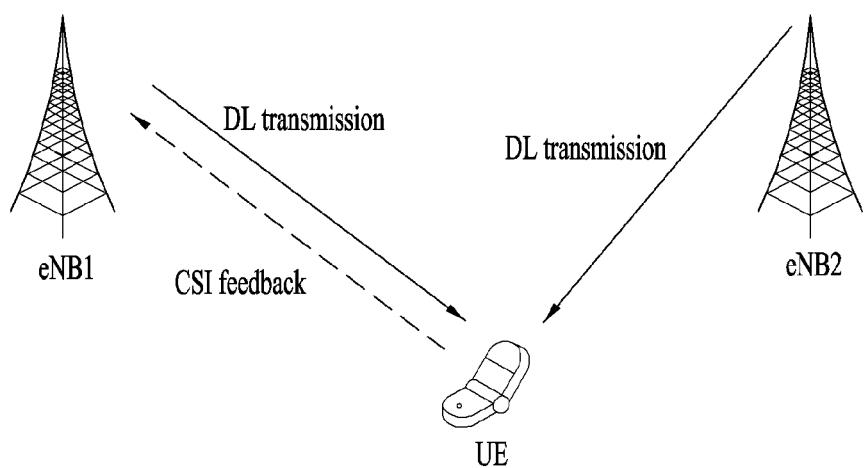
FIG. 6 is a diagram illustrating an example of a DL coordinated multipoint (CoMP) operation.

FIG. 6 is a diagram illustrating an example of a DL CoMP operation.

In the example of FIG. 6, a UE is located between eNBs, i.e., between eNB1 and eNB2. The two eNBs perform a proper CoMP operation, such as joint transmission (JT), dynamic cell selection (DSC), dynamic point blanking (DPB), or coordinated scheduling/coordinated beamforming (CS/CB), in order to cancel interference with the UE. To aid the eNBs in the CoMP operation, the UE performs proper CSI feedback. Information transmitted by CSI feedback may include RI information, PMI information, and CQI information for each eNB and may further include channel information between the two eNBs for JT (e.g., information about a phase offset between a channel from eNB1 to the UE and a channel from eNB2 to the UE) for JT.

FIG. 6 illustrates that the UE reports CSI feedback to eNB1, which is a serving cell thereof. However, the UE may report the CSI feedback to eNB2 or to both of the eNBs, according to situation.

To enable a network to support CoMP scheduling, the UE may feed back not only DL CSI information of a serving eNB/TP but also DL CSI information of a neighbor eNB/TP participating in CoMP. To this end, the UE may generate and feed back CSI about a plurality of CSI processes that reflect various data transmission eNBs/TPs and various interference environments.

An interference measurement resource (IMR) is used to measure interference for use in calculating CoMP CSI. One or more IMRs may be configured for one UE, and the UE has an independent configuration for each of the IMRs. That is, an occurrence period, a subframe offset, and a resource configuration (i.e., an RE mapping location) are independently configured for each IMR, and the network may signal information about the independent configuration for each IMR to the UE by a higher layer (e.g., an RRC layer).

A CSI-RS is used to measure a desired channel or signal which is required for calculating CoMP CSI. One or more CSI-RSs may be configured for the UE, and each of the CSI-RSs has an independent configuration. That is, a transmission period, a subframe, an offset, a resource configuration (i.e., RE mapping location), an assumption of transmit power (i.e., a parameter Pc), and the number of antenna ports may be configured independently for each CSI-RS, and the network may signal information related to the CSI-RS to the UE by the higher layer (e.g., the RRC layer).

One CSI process is defined by associating one CSI-RS resource for signal measurement with one IMR for interference measurement from among one or more of CSI-RSs and one or more IMRs configured for the UE. The UE may feed back CSI calculated or derived from different CSI processes to the network according to independent periods and subframe offsets. That is, each CSI process has an independent CSI feedback configuration. The network may provide the UE with information about association (or combination) of a CSI-RS resource and an IMR and CSI feedback configuration information, with respect to each CSI process, through higher-layer signaling. In the example of FIG. 6, three CSI processes, for example, as listed in Table 3, may be configured for the UE.

TABLE 3

| CSI Process | SMR | IMR |
|---|---|---|
| CSI Process 0 | CSI-RS 0 | IMR 0 |
| CSI Process 1 | CSI-RS 1 | IMR 1 |
| CSI Process 2 | CSI-RS 0 | IMR 2 |

In Table 3, CSI-RS 0 and CSI-RS 1 are respectively a CSI-RS received from eNB1, which is a serving eNB of the UE, and a CSI-RS received from eNB2, which is a neighbor eNB participating in CoMP.

Table 4 below shows 3 IMR configurations in Table 3. In IMR 0, eNB1 is mute (or transmits a null signal), eNB2 is configured with resources on which data is transmitted, and the UE measures interference from the other eNBs except for eNB1. In IMR 1, eNB2 is mute, eNB1 is configured with resources on which data is transmitted, and the UE measures interference from the other eNBs except for eNB2. In IMR 2, both eNB1 and eNB2 are configured with resources for muting, and the UE measures interference from the other eNBs except for eNB1 and eNB2.

TABLE 4

| IMR | eNB1 | eNB2 |
|---|---|---|
| IMR 0 | Muting | Data transmission |
| IMR 1 | Data transmission | Muting |
| IMR 2 | Muting | Muting |

In Table 3, CSI of CSI process 0 represents optimal RI, PMI, and CQI information, in the case in which the UE receives data from eNB1. CSI of CSI process 1 represents optimal RI, PMI, and CQI information, in the case in which the UE receives data from eNB2. CSI of CSI process 2 represents optimal RI, PMI, and CQI information, in the case in which the UE receives data from eNB1 without any interference from eNB2.

In the NR system, a massive multiple input multiple output (MIMO) environment in which the number of transmission/reception (Tx/Rx) antennas is significantly increased may be under consideration. That is, as the massive MIMO environment is considered, the number of Tx/Rx antennas may be increased to a few tens or hundreds. The NR system supports communication in an above 6 GHz band, that is, a millimeter frequency band. However, the millimeter frequency band is characterized by the frequency property that a signal is very rapidly attenuated according to a distance due to the use of too high a frequency band. Therefore, in an NR system operating at or above 6 GHz, beamforming (BF) is considered, in which a signal is transmitted with concentrated energy in a specific direction, not omni-directionally, to compensate for rapid propagation attenuation. Accordingly, there is a need for hybrid BF with analog BF and digital BF in combination according to a position to which a BF weight vector/precoding vector is applied, for the purpose of increased performance, flexible resource allocation, and easiness of frequency-wise beam control in the massive MIMO environment.

Figure 7:
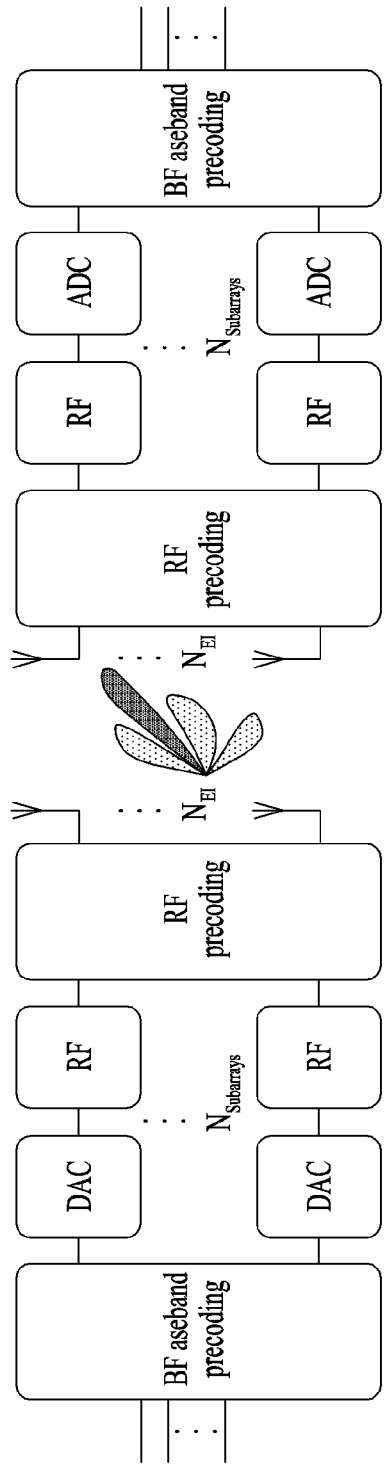
FIG. 7 is a diagram illustrating analog beamforming in the NR system.

FIG. 7 is a block diagram illustrating an exemplary transmitter and receiver for hybrid BF.

To form a narrow beam in the millimeter frequency band, a BF method is mainly considered, in which a BS or a UE transmits the same signal through multiple antennas by applying appropriate phase differences to the antennas and thus increasing energy only in a specific direction. Such BF methods include digital BF for generating a phase difference for digital baseband signals, analog BF for generating phase differences by using time delays (i.e., cyclic shifts) for modulated analog signals, and hybrid BF with digital BF and analog beamforming in combination. Use of a radio frequency (RF) unit (or transceiver unit (TXRU)) for antenna element to control transmission power and phase control on antenna element basis enables independent BF for each frequency resource. However, installing TXRUs in all of about 100 antenna elements is less feasible in terms of cost. That is, a large number of antennas are required to compensate for rapid propagation attenuation in the millimeter frequency, and digital BF needs as many RF components (e.g., digital-to-analog converters (DACs), mixers, power amplifiers, and linear amplifiers) as the number of antennas. As a consequence, implementation of digital BF in the millimeter frequency band increases the prices of communication devices. Therefore, analog BF or hybrid BF is considered, when a large number of antennas are needed as is the case with the millimeter frequency band. In analog BF, a plurality of antenna elements are mapped to a single TXRU and a beam direction is controlled by an analog phase shifter. Because only one beam direction is generated across a total band in analog BF, frequency-selective BF may not be achieved with analog BF. Hybrid BF is an intermediate form of digital BF and analog BF, using B RF units fewer than Q antenna elements. In hybrid BF, the number of beam directions available for simultaneous transmission is limited to B or less, which depends on how B RF units and Q antenna elements are connected.

Downlink Beam Management (DL BM)

BM is a series of processes for acquiring and maintaining a set of BS (or transmission and reception point (TRP)) beams and/or UE beams available for DL and UL transmissions/receptions. BM may include the following processes and terminology.

Beam measurement: the BS or the UE measures the characteristics of a received beamformed signal.

Beam determination: the BS or the UE selects its Tx beam/Rx beam.

Beam sweeping: a spatial domain is covered by using Tx beams and/or Rx beams in a predetermined manner during a predetermined time interval.

Beam report: the UE reports information about a beamformed signal based on a beam measurement.

The BM procedure may be divided into (1) a DL BM procedure using an SSB or CSI-RS and (2) a UL BM procedure using an SRS. Further, each BM procedure may include Tx beam sweeping for determining a Tx beam and Rx beam sweeping for determining an Rx beam.

The DL BM procedure may include (1) transmission of beamformed DL RSs (e.g., CSI-RS or SSB) from the BS and (2) beam reporting from the UE.

A beam report may include preferred DL RS ID(s) and reference signal received power(s) (RSRP(s)) corresponding to the preferred DL RS ID(s). A DL RS ID may be an SSB resource indicator (SSBRI) or a CSI-RS resource indicator (CRI).

Figure 8:
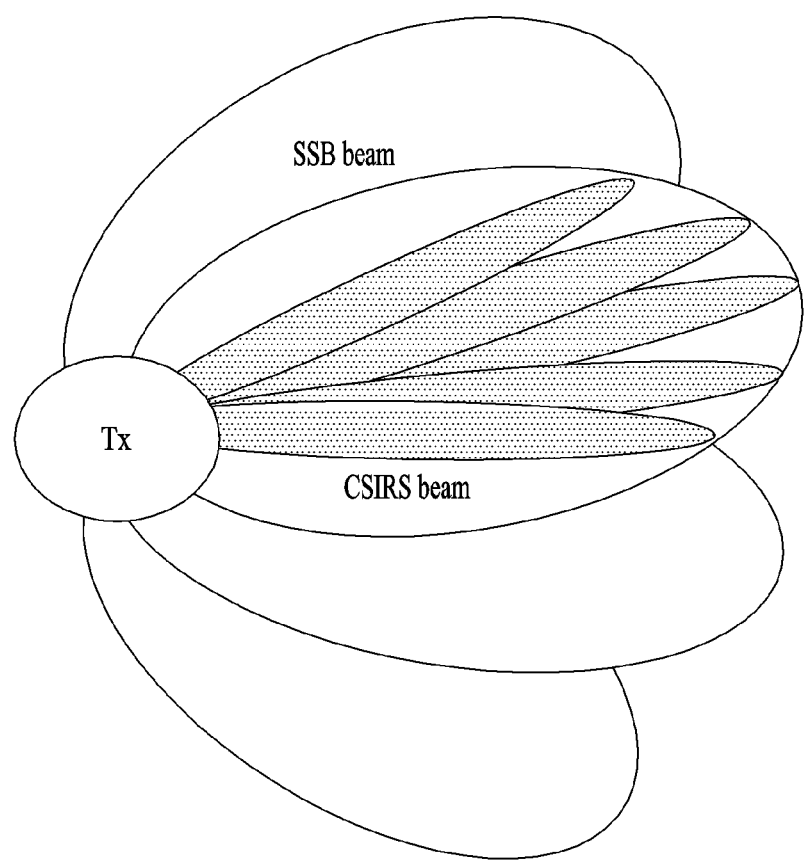

FIG. 8 is a diagram illustrating exemplary BF using an SSB and a CSI-RS.

Referring to FIG. 8, an SSB beam and a CSI-RS beam may be used for beam measurement. A measurement metric is the RSRP of each resource/block. The SSB may be used for coarse beam measurement, whereas the CSI-RS may be used for fine beam measurement. The SSB may be used for both Tx beam sweeping and Rx beam sweeping. SSB-based Rx beam sweeping may be performed by attempting to receive the SSB for the same SSBRI, while changing an Rx beam across multiple SSB bursts at a UE. One SS burst includes one or more SSBs, and one SS burst set includes one or more SSB bursts.

1. DL BM Using SSB

Figure 9:
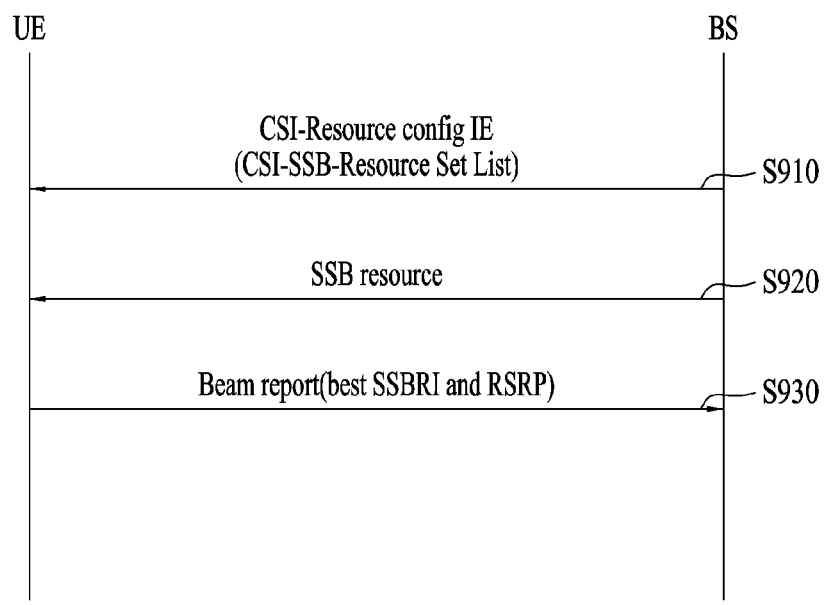

FIG. 9 is a diagram illustrating a signal flow for an exemplary DL BM process using an SSB.

An SSB-based beam report is configured during CSI/beam configuration in RRC_CONNECTED mode.

A UE receives a CSI-ResourceConfig information element (IE) including CSI-SSB-ResourceSetList for SSB resources used for BM from a BS (S910). The RRC parameter, CSI-SSB-ResourceSetList is a list of SSB resources used for BM and reporting in one resource set. The SSB resource set may be configured as {SSBx1, SSBx2, SSBx3, SSBx4}. SSB indexes may range from 0 to 63.

The UE receives signals in the SSB resources from the BS based on CSI-SSB-ResourceSetList (S920).

When CSI-RS reportConfig related to an SSBRI and RSRP reporting has been configured, the UE reports a best SSBRI and an RSRP corresponding to the best SSBRI to the BS (S930). For example, when reportQuantity in the CSI-RS reportConfig IE is set to 'ssb-Index-RSRP', the UE reports the best SSBRI and the RSRP corresponding to the best SSBRI to the BS.

When CSI-RS resources are configured in OFDM symbol(s) carrying an SSB and 'QCL-TypeD' is applicable to the CSI-RS resources and the SSB, the UE may assume that a CSI-RS and the SSB are quasi-co-located (QCLed) from the perspective of 'QCL-TypeD'. QCL-TypeD may mean that antenna ports are QCLed from the perspective of spatial Rx parameters. When the UE receives signals from a plurality of DL antenna ports placed in the QCL-TypeD relationship, the UE may apply the same Rx beam to the signals.

2. DL BM Using CSI-RS

The CSI-RS serves the following purposes: i) when Repetition is configured and TRS_info is not configured for a specific CSI-RS resource set, the CSI-RS is used for BM; ii) when Repetition is not configured and TRS_info is configured for the specific CSI-RS resource set, the CSI-RS is used for a tracking reference signal (TRS); and iii) when either of Repetition or TRS_info is configured for the specific CSI-RS resource set, the CSI-RS is used for CSI acquisition.

When (the RRC parameter) Repetition is set to 'ON', this is related to the Rx beam sweeping process of the UE. In the case where Repetition is set to 'ON', when the UE is configured with NZP-CSI-RS-ResourceSet, the UE may assume that signals in at least one CSI-RS resource within NZP-CSI-RS-ResourceSet are transmitted through the same DL spatial domain filter. That is, the at least one CSI-RS resource within NZP-CSI-RS-ResourceSet is transmitted on the same Tx beam. The signals in the at least one CSI-RS resource within NZP-CSI-RS-ResourceSet may be transmitted in different OFDM symbols.

Figure 13:
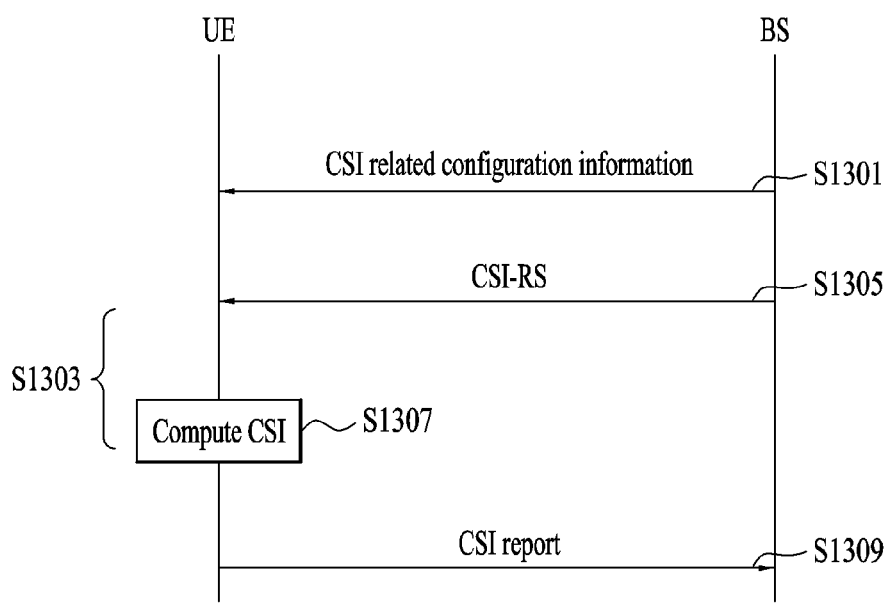
FIG. 13 is a diagram illustrating a signal flow for channel state information (CSI) reporting.

On the contrary, when Repetition is set to 'OFF', this is related to the Tx beam sweeping process of the BS. In the case where Repetition is set to 'OFF', the UE does not assume that signals in at least one CSI-RS resource within NZP-CSI-RS-ResourceSet are transmitted through the same DL spatial domain filter. That is, the signals in the at least one CSI-RS resource within NZP-CSI-RS-ResourceSet are transmitted on different Tx beams. FIG. 13 illustrates another exemplary DL BM process using a CSI-RS.

FIG. 10(a) illustrates an Rx beam refinement process of a UE, and FIG. 10(b) illustrates a Tx beam sweeping process of a BS. Further, FIG. 10(a) is for a case in which Repetition is set to 'ON', and FIG. 10(b) is for a case in which Repetition is set to 'OFF'.

With reference to FIGS. 10(a) and 11(a), an Rx beam determination process of a UE will be described below.

FIG. 11(a) is a diagram illustrating a signal flow for an exemplary Rx beam determination process of a UE.

The UE receives an NZP CSI-RS resource set IE including an RRC parameter 'Repetition' from a BS by RRC signaling (S1110). The RRC parameter 'Repetition' is set to 'ON' herein.

The UE repeatedly receives signals in resource(s) of a CSI-RS resource set for which the RRC parameter 'Repetition' is set to 'ON' on the same Tx beam (or DL spatial domain Tx filter) of the BS in different OFDM symbols (S1120).

The UE determines its Rx beam (S1130).

The UE skips CSI reporting (S1140). That is, the UE may skip CSI reporting, when the RRC parameter 'Repetition' is set to 'ON'.

With reference to FIGS. 10(b) and 11(b), a Tx beam determination process of a BS will be described below.

FIG. 11(b) is a diagram illustrating an exemplary Tx beam determination process of a BS.

A UE receives an NZP CSI-RS resource set IE including an RRC parameter 'Repetition' from the BS by RRC signaling (S1150). When the RRC parameter 'Repetition' is set to 'OFF', this is related to a Tx beam sweeping process of the BS.

The UE receives signals in resource(s) of a CSI-RS resource set for which the RRC parameter 'Repetition' is set to 'OFF' on different Tx beams (or DL spatial domain Tx filters) of the BS (S1160).

The UE selects (or determines) a best beam (S1170).

The UE reports the ID (e.g., CRI) of the selected beam and related quality information (e.g., an RSRP) to the BS (S1180). That is, the UE reports a CRI and an RSRP corresponding to the CRI, when a CSI-RS is transmitted for BM.

Figure 10:
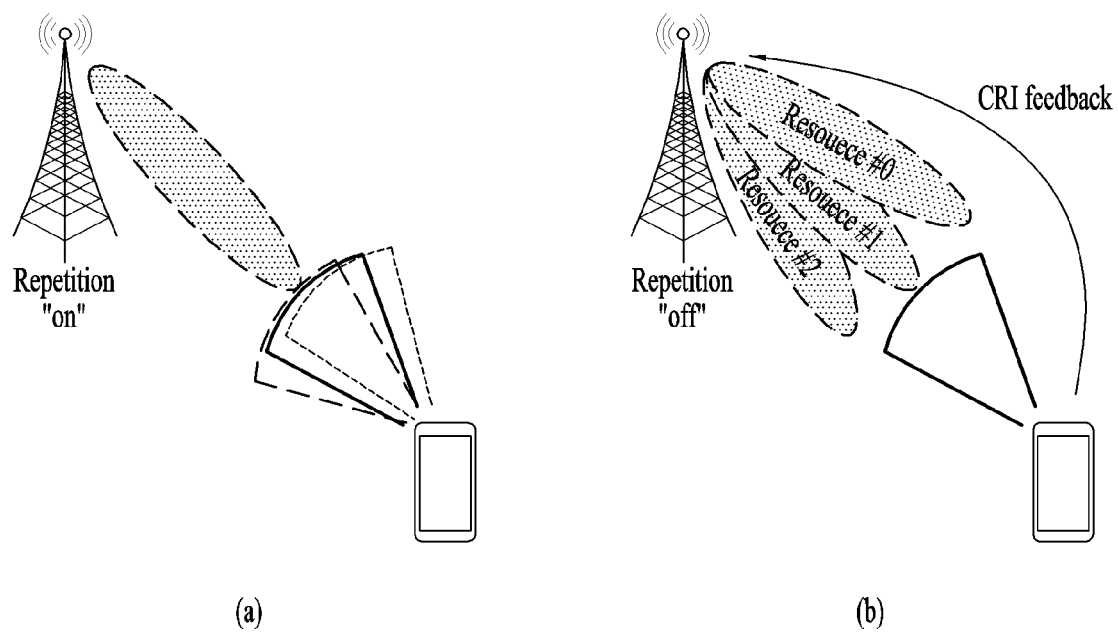
Figure 12:
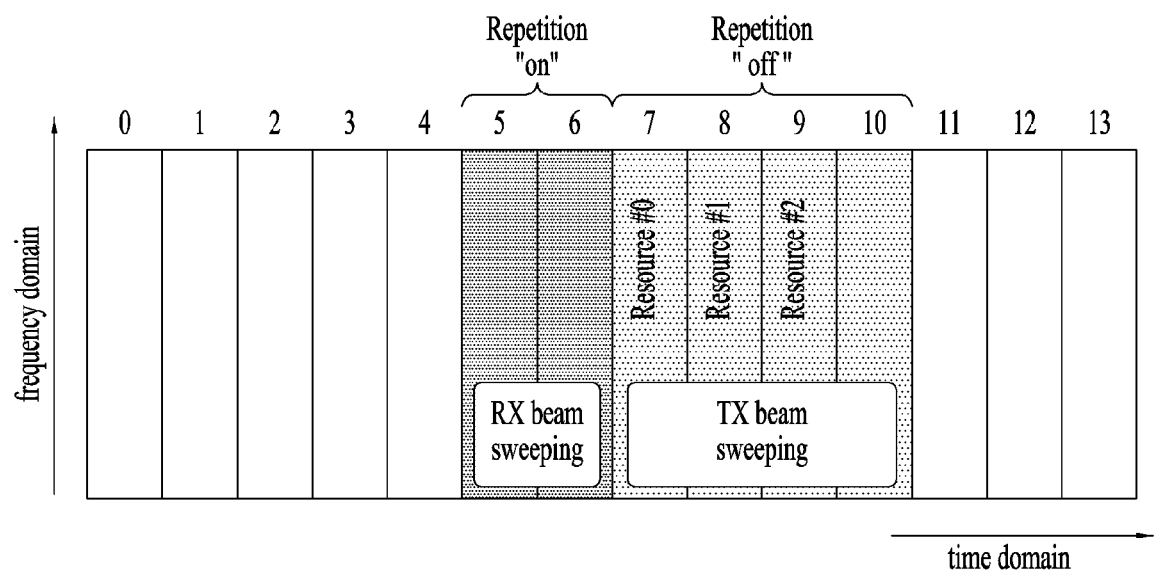

FIG. 12 is a diagram illustrating exemplary resource allocation in the time and frequency domains, which is related to the operation of FIG. 10.

When Repetition is set to 'ON' for a CSI-RS resource set, a plurality of CSI-RS resources may be repeatedly used on the same Tx beam, whereas when Repetition is set to 'OFF' for the CSI-RS resource set, different CSI-RS resources may be repeatedly transmitted on different Tx beams.

3. DL BM-Related Beam Indication

The UE may receive at least a list of up to M candidate transmission configuration indication (TCI) states for QCL indication by RRC signaling. M depends on a UE capability and may be 64.

Each TCI state may be configured with one RS set. Table 5 describes an example of a TCI-State IE. The TC-State IE is related to a QCL type corresponding to one or two DL RSs.

TABLE 5

```
-- ASN1START
-- TAG-TCI-STATE-START
TCI-State ::=                SEQUENCE{
  tci-StateId               ,
  qcl-Type1                 QCL-Info,
  qcl-Type2                 QCL-Info
  ...
QCL-Info ::=                SEQUENCE {
  cell                      ServCellIndex
  bwp-Id                    BWP-Id
  referenceSignal           CHOICE {
    csi-rs                  NZP-CSI-RS-ResourceId,
    ssb                     SSB-Index
  },
  qcl-Type                  ENUMERATED {typeA, typeB,
typeC, typeD}
  ...
}
-- TAG-TCI-STATE-STOP
```

In Table 5, 'bwp-Id' identifies a DL BWP in which an RS is located, 'cell' indicates a carrier in which the RS is located, and 'referencesignal' indicates reference antenna port(s) serving as a QCL source for target antenna port(s) or an RS including the reference antenna port(s). The target antenna port(s) may be for a CSI-RS, PDCCH DMRS, or PDSCH DMRS.

4. Quasi-Co Location (QCL)

The UE may receive a list of up to M TCI-State configurations to decode a PDSCH according to a detected PDCCH carrying DCI intended for a given cell. M depends on a UE capability.

As described in Table 4, each TCI-State includes a parameter for establishing the QCL relationship between one or more DL RSs and a PDSCH DM-RS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info and may have one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is for a specific NZP CSI-RS, the NZP CSI-RS antenna port may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS.

CSI-Related Operations

In the NR system, a CSI-RS is used for time/frequency tracking, CSI computation, reference signal received power (RSRP) calculation, and mobility. CSI computation is related to CSI acquisition, and RSRP computation is related to beam management (BM).

FIG. 13 is a diagram illustrating a signal flow for a CSI-related process.

For one of the above-described uses of the CSI-RS, a UE receives CSI-related configuration information from a BS by RRC signaling (S1301).

The CSI-related configuration information may include at least one of channel state information interference measurement (CSI-IM) resource-related information, CSI measurement configuration-related information, CSI resource configuration-related information, CSI-RS resource-related information, or CSI report configuration-related information.

i) The CSI-IM resource-related information may include CSI-IM resource information, CSI-IM resource set information, and so on. A CSI-IM resource set is identified by a CSI-IM resource set ID, and one CSI-IM resource set includes at least one CSI-IM resource. Each CSI-IM resource is identified by a CSI-IM resource ID.

ii) The CSI resource configuration-related information may be represented by a CSI-ResourceConfig information element (IE). The CSI resource configuration-related information defines a group including at least one of a non-zero power (NZP) CSI-RS resource set, a CSI-IM resource set, or a CSI-SSB resource set. That is, the CSI resource configuration-related information may include a CSI-RS resource set list, and the CSI-RS resource set list may include at least one of an NZP CSI-RS resource set list, a CSI-IM resource set list, or a CSI-SSB resource set list. The CSI-RS resource set is identified by a CSI-RS resource set ID, and one CSI-RS resource set includes at least one CSI-RS resource. Each CSI-RS resource is identified by a CSI-RS resource ID.

An RRC parameter indicating the use of a CSI-RS (e.g., a BM-related parameter 'repetition' and a tracking-related parameter 'trs-Info') may be configured for each NZP CSI-RS resource set.

iii) The CSI report configuration-related information includes a parameter indicating a time-domain behavior, reportConfigType and a parameter indicating a CSI-related quantity to be reported, reportQuantity. The time-domain behavior may be periodic, aperiodic, or semi-persistent.

The UE measures CSI based on the CSI-related configuration information (S1305). The CSI measurement may include (1) CSI-RS reception of the UE (S1303) and (2) CSI computation in the received CSI-RS (S1307). Mapping of the CSI-RS to REs of CSI-RS resources in the time and frequency domains is configured by an RRC parameter, CSI-RS-ResourceMapping.

The UE reports the measured CSI to the BS (S1309).

1. CSI Measurement

The NR system supports more flexible and more dynamic CSI measurement and reporting. The CSI measurement may include reception of a CSI-RS and measurement of the received CSI-RS to acquire CSI.

As the time-domain behavior of CSI measurement and reporting, channel measurement (CM) and interference measurement (IM) are supported.

A CSI-IM-based IM resource (IMR) is designed in NR, similarly to a CSI-IM in LTE and configured independently of a zero power (ZP) CSI-RS resource for PDSCH rate matching.

The BS transmits an NZP CSI-RS to the UE on each port of a configured NZP CSI-RS-based IMR.

When there is no PMI and RI feedback for a channel, multiple resources are configured in a set, and the BS or network indicates a subset of NZP CSI-RS resources for channel measurement and/or interference measurement by DCI.

A resource setting and a resource setting configuration will be described in greater detail.

1. 1. Resource Setting

Each CSI resource setting 'CSI-ResourceConfig' includes a configuration of S≥1 CSI resource sets (given by an RRC parameter csi-RS-ResourceSetList). S represents the number of configured CSI-RS resource sets. The configuration of S≥1 CSI resource sets includes each CSI resource set including (NZP CSI-RS or CSI-IM) CSI-RS resources, and SSB resources used for RSRP computation.

Each CSI resource setting is located in a DL BWP identified by an RRC parameter bwp-id. All CSI resource settings linked to a CSI reporting setting have the same DL BWP.

The time-domain behavior of a CSI-RS resource within the CSI-ResourceConfig IE is indicated by an RRC parameter resourceType in the CSI resource setting, and may be set to aperiodic, periodic, or semi-persistent.

One or more CSI resource settings for channel measurement and interference measurement are configured by RRC signaling. A channel measurement resource (CMR) may be an NZP CSI-RS for CSI acquisition, and an IMR may be an NZP CSI-RS for CSI-IM and IM. The CSI-IM (or ZP CSI-RS for IM) is mainly used for inter-cell measurement. The NZP CSI-RS for IM is used mainly for measurement of intra-cell interference from multiple users.

The UE may assume that CSI-RS resource(s) for channel measurement and CSI-IM/NZP CSI-RS resource(s) for interference measurement configured for one CSI report are resource-wise quasi co-located (QCLed) with respect to 'QCL-TypeD'.

1. 2. Resource Setting Configuration

A resource setting may mean a resource set list, and one reporting setting may be linked to up to three resource settings.

When one resource setting is configured, the resource setting (given by an RRC parameter resourcesForChannelMeasurement) is for channel measurement for RSRP computation.

When two resource settings are configured, the first resource setting (given by the RRC parameter resourcesForChannelMeasurement) is for channel measurement and the second resource setting (given by csi-IM-ResourcesForInterference or nzp-CSI-RS-ResourcesForInterference) is for interference measurement on the CSI-IM or on the NZP CSI-RS.

When three resource settings are configured, the first resource setting (given by resourcesForChannelMeasurement) is for channel measurement, the second resource setting (given by csi-IM-ResourcesForInterference) is for CSI-IM-based interference measurement, and the third resource setting (given by nzp-CSI-RS-ResourcesForInterference) is for NZP CSI-RS-based interference measurement.

When one resource setting (given by resourcesForChannelMeasurement) is configured, the resource setting is for channel measurement for RSRP computation.

When two resource settings are configured, the first resource setting (given by resourcesForChannelMeasurement) is for channel measurement and the second resource setting (given by the RRC parameter csi-IM-ResourcesForInterference) is used for interference measurement performed on the CSI-IM.

1. 3. CSI Computation

If interference measurement is performed on the CSI-IM, each CSI-RS resource for channel measurement is resource-wise associated with a CSI-IM resource by the ordering of the CSI-RS resources and CSI-IM resources in a corresponding resource set. The number of CSI-RS resources for channel measurement equals to the number of CSI-IM resources.

For CSI measurement, the UE assumes the following.

Each NZP CSI-RS port configured for interference measurement corresponds to an interference transmission layer.

All interference transmission layers on NZP CSI-RS ports for interference measurement take into account energy per resource element (EPRE) ratios.

The UE assumes another interference signal on RE(s) of NZP CSI-RS resources for channel measurement, NZP CSI-RS resources for interference measurement, or CSI-IM resources for interference measurement.

2. CSI Reporting

Time and frequency resources available for the UE to report CSI are controlled by the BS.

For a CQI, a PMI, a CSI-RS resource indicator (CRI), an SSB resource indicator (SSBRI), a layer indicator (LI), an RI, and an RSRP, the UE receives RRC signaling including N≥1 CSI-ReportConfig reporting settings, M≥1 CSI-ResourceConfig resource settings, and one or two lists of trigger states (given by aperiodicTriggerStateList and semiPersistentOnPUSCH-TriggerStateList). Each trigger state in aperiodicTriggerStateList includes a list of associated CSI-ReportConfigs indicating resource set IDs for a channel and optionally for interference. Each trigger state in semiPersistentOnPUSCH-TriggerStateList contains one associated CSI-ReportConfig.

That is, the UE transmits a CSI report indicated by CSI-ReportConfigs associated with a corresponding CSI-RS resource setting to the BS. For example, the UE may report at least one of a CQI, a PMI, a CRI, an SSBRI, an LI, an RI, or an RSRP as indicated by CSI-ReportConfigs associated with the CSI resource setting. However, if CSI-ReportConfigs associated with the CSI resource setting indicates 'none', the UE may not report CSI or an RSRP associated with the CSI resource setting. The CSI resource setting may indicate resources for an SS/PBCH block.

In a current new radio access technology (NR) system, a time-domain behavior of a CSI-RS may be defined as one of a periodic (P) behavior, a semi-persistent (SP) behavior, and an aperiodic (AP) behavior, with respect to each CSI-RS resource setting. In addition, a specific CSI reporting setting configured in connection with the CSI-RS resource setting may be configured for the UE to derive and report CSI content such as a PMI/CQI/RI with respect to a CSI-RS resource set and/or a CSI-RS resource setting, having the same single time-domain behavior. The UE may be configured to derive and report CSI contents such as PMI/CQI/RI for resource setting.

However, in a network environment in which various wireless various wireless network operation scenarios such as a macro cell/small cell/pico cell/radio remote head (RRH) are mixed, an RS resource for CSI measurement (e.g. a CSI-RS resource) or an RS resource group (e.g., a CSI-RS resource set and/or a CSI-RS resource setting), having a different time-domain behavior, may be configured for the UE and the UE needs to perform CSI feedback and/or CSI reporting, corresponding to the RS resource or the RS resource group.

To select Tx beams of some higher TPs/BSs or TPs/eNBs to effectively transmit data to the UE using a CoMP scheme from among Tx beams of many neighbor TPs/BSs in the vicinity of the UE, the BS needs to select N (N≥1) higher optimal CSI-RS resources from among total CSI-RS resource sets or total CSI-RS resource settings. In this case, although CSI may be reported with respect to each CSI-RS resource set or each CSI-RS resource setting, this method may be disadvantageous in terms of signaling overhead from the UE to the BS.

Accordingly, the present disclosure proposes a method of reducing signaling overhead and calculation complexity that may occur when numerous cells or BSs are placed in performing a CSI report.

The CSI-RS resource set may represent a group of CSI-RS resources as a result of grouping a plurality of CSI-RS resources and the CSI-RS resource setting may represent a group of CSI-RS resource sets as a result of grouping a plurality of CSI-RS resource sets. In other words, the CSI-RS resource set may be obtained by grouping CSI-RS resources and the CSI-RS resource setting may obtained by regrouping the CSI-RS resource sets.

Notably, in the present disclosure, since both the CSI-RS resource set and the CSI-RS resource setting include a plurality of CSI-RS resources, the CSI-RS resource set and the CSI-RS resource setting may be collectively referred to as a CSI-RS resource group. That is, even though a description of the CSI-RS resource set is given in the present disclosure, it is apparent that an embodiment of the present disclosure is not limitedly interpreted as the CSI-RS resource set and may be interpreted by replacing the CSI-RS resource set with the CSI-RS resource setting.

Figure 14:
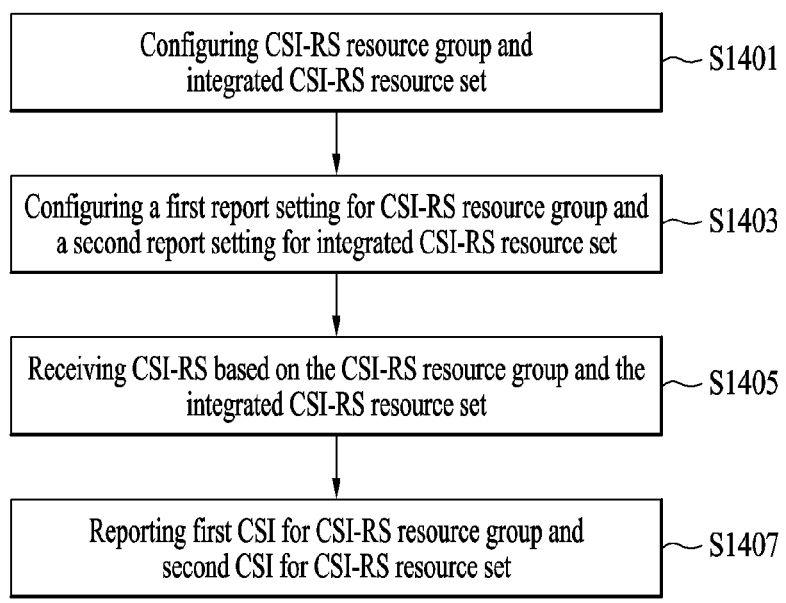
FIGS. 14 to 16 are diagrams illustrating an example of implementing operations of a UE, a BS, and a network according to an embodiment of the present disclosure.
Figure 15:
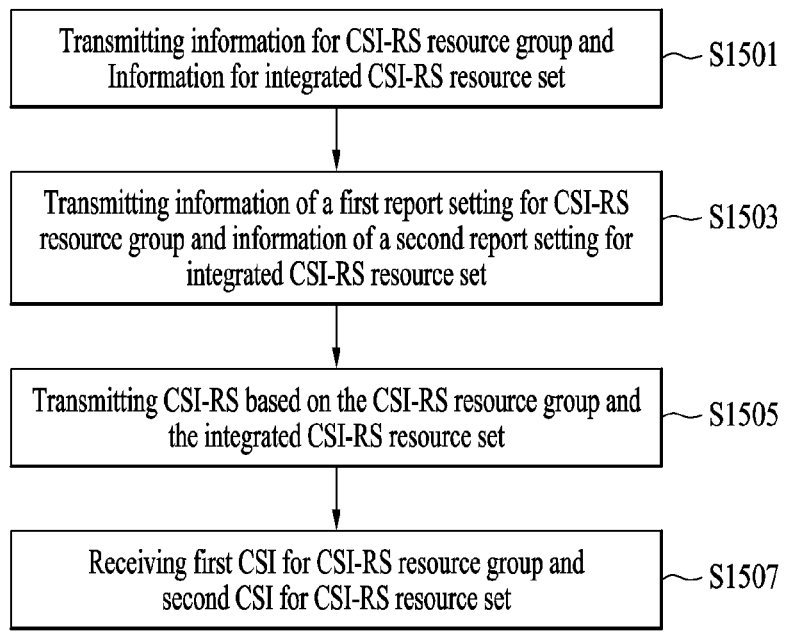
Figure 16:
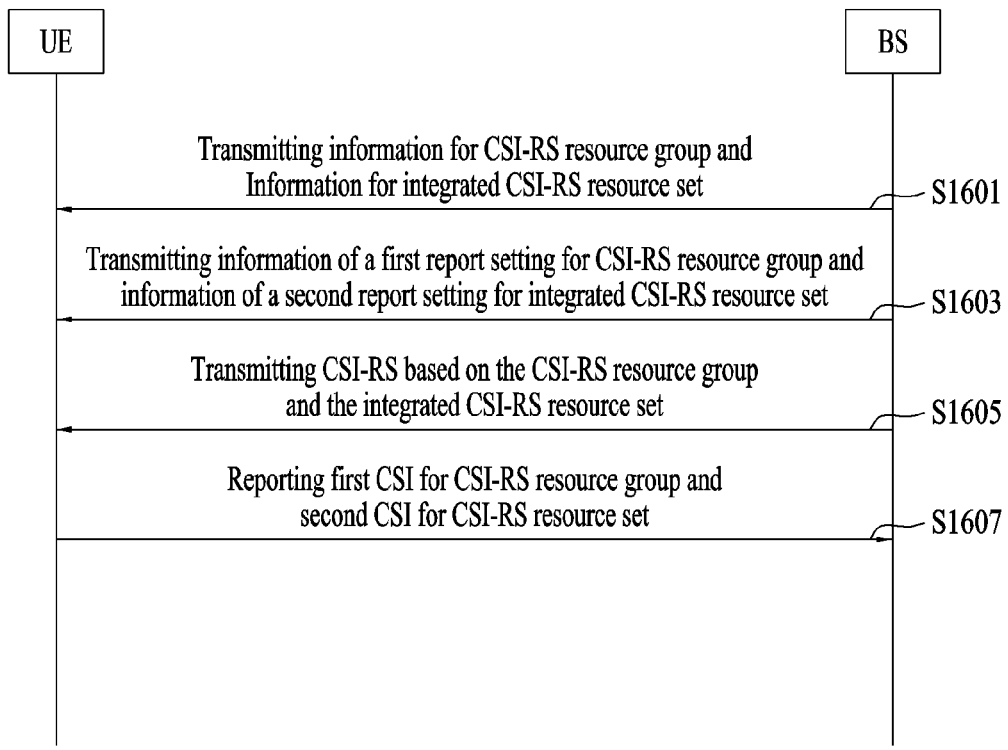

FIGS. 14 to 16 are diagrams illustrating an example of implementing operations of a UE, a BS, and a network according to an embodiment of the present disclosure.

An example of implementing the operation of the UE according to an embodiment of the present disclosure will now be described with reference to FIG. 14. The UE may configure a CSI-RS resource group, that corresponds to a CSI-RS resource set and/or a CSI-RS resource setting, and an integrated CSI-RS resource set, that is obtained by regrouping a plurality of CSI-RS resource groups (S1401).

A detailed method of configuring the CSI-RS resource group and the integrated CSI-RS resource set may be based on Embodiment 1 described later.

The UE may configure a CSI reporting setting associated with the CSI-RS resource group and a CSI reporting setting associated with the integrated CSI-RS resource set (S1403). A method of configuring the CSI reporting settings associated respectively with the CSI-RS resource group and the integrated CSI-RS resource set may be based on Embodiment 2 described later.

Next, the UE may receive a CSI-RS based on configuration for the CSI-RS resource group and configuration for the integrated CSI-RS resource set (S1405) and report CSI based on the CSI reporting settings associated respectively with the CSI-RS resource group and the integrated CSI-RS resource set (S1407). A method of reporting the CSI based on the CSI reporting settings associated respectively with the CSI-RS resource group and the integrated CSI-RS resource set, and reported CSI content may be based on Embodiment 2 described later.

FIG. 15 is a diagram illustrating an example of implementing the operation of the BS according to an embodiment of the present disclosure. Referring to FIG. 15, the BS may transmit information for configuring a CSI-RS resource group and information for configuring an integrated CSI-RS resource set to the UE (S1501). The information for configuring the CSI-RS resource group and the information for configuring the integrated CSI-RS resource set may be determined based on Embodiment 1 described later.

The BS may transmit information about a CSI reporting setting associated with the CSI-RS resource group and information about a CSI reporting setting associated with the integrated CSI-RS resource set to the UE (S1503). The information about the CSI reporting setting associated with the CSI-RS resource group and the information about the CSI reporting setting associated with the integrated CSI-RS resource set may be determined based on Embodiment 2 described later.

The BS may transmit CSI-RSs corresponding to the CSI-RS resource group and the integrated CSI-RS resource set to the UE (S1505) and receive CSI about a measured CSI-RS resource group and CSI about the integrated CSI-RS resource set from the UE (S1507). A method of receiving the CSI reported based on the CSI reporting settings associated respectively with the CSI-RS resource group and the integrated CSI-RS resource set, and reported CSI content may be based on Embodiment 2 described later.

FIG. 16 is a diagram illustrating an example of implementing the operation of the network according to an embodiment of the present disclosure. Referring to FIG. 16, the BS may transmit information for configuring a CSI-RS resource group and information for configuring an integrated CSI-RS resource set to the UE (S1601). The information for configuring the CSI-RS resource group and the information for configuring the integrated CSI-RS resource set may be determined based on Embodiment 1 described later.

The BS may transmit information about a CSI reporting setting associated with the CSI-RS resource group and information about a CSI reporting setting associated with the integrated CSI-RS resource set to the UE (S1603). The information about the CSI reporting setting associated with the CSI-RS resource group and the information about the CSI reporting setting associated with the integrated CSI-RS resource set may be determined based on Embodiment 2 described later.

The BS may transmit CSI-RSs corresponding to the CSI-RS resource group and the integrated CSI-RS resource set to the UE (S1605). The UE may report CSI based on the CSI reporting settings associated respectively with the CSI-RS resource group and the integrated CSI-RS resource set (S167). A method of reporting the CSI based on the CSI reporting settings associated respectively with the CSI-RS resource group and the integrated CSI-RS resource set, and reported CSI content may be based on Embodiment 2 described later.

1. Embodiment 1: Method of Configuring Integrated CSI-RS Resource Set

In the present disclosure, a separate CSI-RS set/group may be defined including some or all elements (e.g., a CSI-RS resource, a CSI-RS resource set, a CSI-RS resource setting, etc.) included in one or more CSI-RS resource groups such as a CSI-RS resource set and/or a CSI-RS resource setting. In addition, the CSI-RS set/group configured as described above or a similar or identical idea or concept thereto may be referred to or defined as an "integrated CSI-RS resource set" for convenience. In this case, configuration parameters including a time-domain parameter (e.g., a P/AP/SP behavior) of each unit/group (e.g., a CSI-RS resource, a CSI-RS resource set, or a CSI-RS resource setting) constituting one integrated CSI-RS resource set may be differently configured by the BS.

In this case, the UE may be instructed or configured through a higher layer, such as an RRC layer, or dynamic signaling, such as a MAC-control element (CE)/DCI, to configure or recognize all or part of configured CSI-RS resources or CSI-RS resource groups (e.g., CSI-RS resource sets and/or CSI-RS resource settings) as one specific integrated CSI-RS resource set. In other words, the UE may be configured or instructed by the BS to additionally group preset CSI-RS resources or CSI-RS resource groups (e.g., CSI-RS resource sets and/or CSI-RS resource settings).

For example, the BS may indicate or configure CSI-RS resource IDs and/or CSI-RS resource set IDs to be configured as the integrated CSI-RS resource set to or for the UE. Alternatively, the BS may simultaneously configure a unit of the "integrated CSI-RS resource set" through RRC signaling or may explicitly configure a lower resource or a resource group unit constituting the "integrated CSI-RS resource set" through additional hierarchical configuration.

Such a configuration of the integrated CSI-RS resource set may be useful in a heterogeneous network environment as described above. For example, a configuration and/or structure such as the integrated CSI-RS resource set may be needed for the BS to instruct or configure the UE to calculate and report a specific best CSI content, such as a CSI-RS resource indicator (CRI), and/or K (>1) best CSI contents, in consideration of all CSI-RS resources included in different CSI-RS resource sets.

As a more specific example, assume that there are N periodic CSI-RS resource sets corresponding to N macro BSs and M aperiodic CSI-RS resource sets corresponding to M small BSs that may be dynamically turned on and off. Considering that all of these N+M BSs are CoMP candidates for dynamic point selection (DPS) or joint transmission (JT), when a specific UE calculates the best CRI or K best CRIs and reports the same to the BS, it is necessary to report the best CRI or the K best CRIs by configuring a plurality of CSI-RS resource sets as one integrated CSI-RS resource set. On the other hand, since CSI reporting settings configured respectively for the plural CSI-RS resource sets may be different, when the UE reports the best CRI or the K best CRIs, whether a CSI reporting setting corresponding to each CRI is periodic, aperiodic, or semi-persistent may also be reported to the BS.

As another example, N periodic or semi-persistent CSI-RS resource sets having different CSI-RS transmission periodicities due to different channel fading environments between N transmission points (TPs) including macro cells or small cells such as RRHs and the UE may be configured.

In this case, if all of the above-described N TPs are considered as the CoMP candidates, N CSI-RS resource sets may be configured as one integrated CSI-RS resource set. In addition, the UE may be instructed or configured to report the best CSI content, such as the best CRI, and K best CRI contents, such as the K best CRIs, based on the integrated CSI-RS resource set.

All CSI-RS resources and all CSI-RS resource sets, constituting the integrated CSI-RS resource set, may be limitedly configured or instructed to have the same ratio of PDSCH power to CSI-RS power. That is, upon detecting the largest RSRP and a CRI corresponding thereto by considering different CSI-RS resource sets as one integrated CSI-RS resource set, the same power may need to be allocated to each CSI-RS resource for fair comparison of RSRP values of different CSI-RS resources.

If CSI-RS resources included in the integrated CSI-RS resource set are configured to have different ratios of PDSCH power to CSI-RS power, the UE may correct RSRP values by reflecting a difference between the different ratios of PDSCH power to CSI-RS power upon calculating the RSRP values and then select and report a CRI and/or a CSI-RS resource set indicator (CRSI).

Meanwhile, when aperiodic CSI-RS resources and periodic/semi-persistent CSI-RS resources are configured together as the integrated CSI-RS resource set, measurement restriction for the periodic/semipersistent CSI-RS resources may be configured or indicated for or to the UE as "ON" through higher layer signaling and/or lower layer signaling in order to configure CSI measurement accuracy acquired through the aperiodic CSI-RS resources and a CSI measurement accuracy acquired through the periodic/semipersistent CSI-RS resources as similar levels. Here, the measurement restriction may mean that, for example, CSI measurement is limitedly performed in only one slot or in a specific number of slots in the time domain. Alternatively, even if there is no measurement restriction for the periodic/semi-persistent CSI-RS resources configured or indicated as "ON", the UE may automatically recognize that CSI measurement is performed only in a specific slot for the periodic/semi-persistent CSI-RS resources. Alternatively, the UE may automatically recognize that the measurement restriction for the periodic/semi-permanent CSI-RS resources is configured as "ON".

In Embodiment 1, the UE may be instructed or configured by the BS to limitedly configure one integrated CSI-RS resource set only with CSI-RS resource sets having the same configuration of "repetition" which is a higher layer parameter. Here, the CSI-RS resource sets having the same configuration of "repetition" may mean a CSI-RS resource set having no configuration of "repetition" which is the higher layer signal or a CSI-RS resource set in which the configuration of "repetition" is equally configured as ON or OFF.

2. Embodiment 2: CSI Reporting Method Related to Integrated CSI-RS Resource Set

If a value of the best measurement content or K best measurement contents, for a specific CSI-RS resource group (e.g., a CSI-RS resource set, a CSI-RS resource setting, or an integrated CSI-RS resource set) that is implicitly and/or explicitly indicated or designated by the BS, is greater than a specific threshold value, the UE may report the best CSI content (e.g., the best CRI) or K best CSIs (e.g., K best CRIs) only for the CSI-RS resource group indicated by the BS. However, if the value of the best measurement content or the K best measurement contents is less than the specific threshold value, the UE may report the best CSI content (e.g., the best CRI) or K best CSI contents (e.g., K best CRIs) for a specific integrated CSI-RS resource set indicated or configured by the BS.

Here, the best measurement content may be the largest RSRP, the highest signal-to-noise ratio (SNR) and/or the highest signal-to-interference-plus-noise ratio (SINR). Similarly, the K best measurement contents may be L largest RSRP values, K highest SNRs, and/or K highest SINRs.

In addition, the specific threshold may be determined offline, or may be configured or indicated through higher layer signaling such as RRC signaling and/or through dynamic signaling such as DCI/MAC-CE by the BS.

Through the above-described method, a CoMP scheduling unit of the heterogeneous network may be configured in consideration of data traffic load of a macro cell. If possible, data may be transmitted to the UE maximally using a small BS such as a femto/pico cell that is temporarily turned on.

For example, it is assumed that there are a periodic CSI-RS resource set including N CSI-RS resources corresponding to N macro BSs and an aperiodic CSI-RS resource set including M CSI-RS resources corresponding to M small BSs. If K largest RSRP values in the aperiodic CSI-RS resource set are greater than a specific threshold value, the UE may perform JT using K small BSs. On the other hand, if the K largest RSRP values in the aperiodic CSI-RS resource set are less than the specific threshold value, the UE may perform JT using K BSs corresponding to the K largest RSRP values by considering all of the macro BSs and the small BSs as CoMP candidates.

In addition, when one or more reported RSRP values are lower than the specific threshold value, the BS may instruct the UE to report a CSI content for the integrated CSI-RS resource set again. However, in this case, overhead and latency for CSI feedback and/or CSI reporting may increase.

Even when CSI-RS resource sets constituting the integrated CSI-RS resource set are connected to CSI reporting settings, and a time-domain reporting behavior and/or a report quantity is preset, a time-domain reporting behavior and/or a report quantity for the integrated CSI-RE resource set may be separately indicated to or configured for the UE.

For example, CSI-RS resource sets #0 and #1 and an integrated CSI-RS resource set may be configured as respective independent CSI reporting settings as illustrated in FIG. 17(a). Alternatively, when the CSI reporting setting for the integrated CSI-RS resource set is not independently configured, for example, when the integrated CSI-RS resource set is not connected to a specific CSI reporting setting, a time-domain reporting behavior and/or a report quantity for the integrated CSI-RS resource set may be instructed or configured to conform to a CSI reporting setting associated with a specific CSI-RS resource set constituting the integrated CSI-RS resource set.

Here, the time-domain reporting behavior included in the CSI reporting setting is related to whether CSI reporting is periodically/aperiodically/semi-persistently performed. The report quantity included in the CSI reporting setting may represent content included in CSI during CSI reporting. For example, the content included in the CSI may include at least one of RI/PMI/CQI/CRI/RSRP/none.

Unlike the example of FIG. 17(a), the integrated CSI-RS resource set may be configured as shown in FIG. 17(b). A CSI-RS resource group, such as a CSI-RS resource set or a CSI resource setting, may be connected to one CSI reporting setting. In this case, the BS may instruct or configure the UE to calculate CSI contents by considering CSI-RS resource groups connected together to one CSI reporting setting as one integrated CSI-RS resource set.

For example, referring to FIG. 17(b), CSI-RS resource set #0 and CSI-RS resource set #1 may be independently connected to CSI reporting setting #0 and CSI reporting setting #1, respectively, and CSI-RE resource set #0 and CSI-RS resource set #1 may be configured to be connected together to CSI reporting setting #2.

In this case, CSI contents (e.g., the best CRT or K best CRIs) may be configured to be reported by considering the CSI resource sets #0 and #1 connected together to the CSI reporting setting #2 as one integrated CSI-RS resource set. Referring to FIG. 17(b), it may be appreciated that CSI-RS resource sets are grouped as the integrated CSI-RS resource set by configuring an "integrated CRT" with respect to CSI reporting setting #2.

If time-domain reporting behaviors for CSI-RS resources or group units (e.g., CSI-RS resources, CSI-RS resource sets, or CSI-RS resource settings) constituting the integrated CSI-RS resource set are configured to be the same, even if there is no separate configuration for a time-domain reporting behavior for the integrated CSI-RS resource set, the UE may automatically recognize that an identically configured reporting behavior as a reporting behavior for the integrated CSI-RS resource set. The same principle may be extended or applied to other configuration parameters related to CSI report configuration such as CSI report quantity in addition to the time-domain reporting behavior. Therefore, the spirit of the present disclosure may be expanded even in this case. Additionally, when the integrated CRT reporting is indicated or configured as the CSI reporting setting as shown in FIG. 17(b), an index/ID such as a reception panel/beam/filter corresponding to the integrated CRT reporting may be configured or indicated together.

Further, the UE may be instructed or configured to follow a CSI reporting setting for the integrated CSI-RS resource set to be the same as a CSI reporting setting preconfigured in a specific CSI-RS resource set constituting the integrated CSI-RS resource set. In this case, a CSI report for a CSI-RS resource set included in the integrated CSI-RS resource set may be omitted or excluded and only a CSI report for the integrated CSI-RS resource set may be performed.

Figure 18:
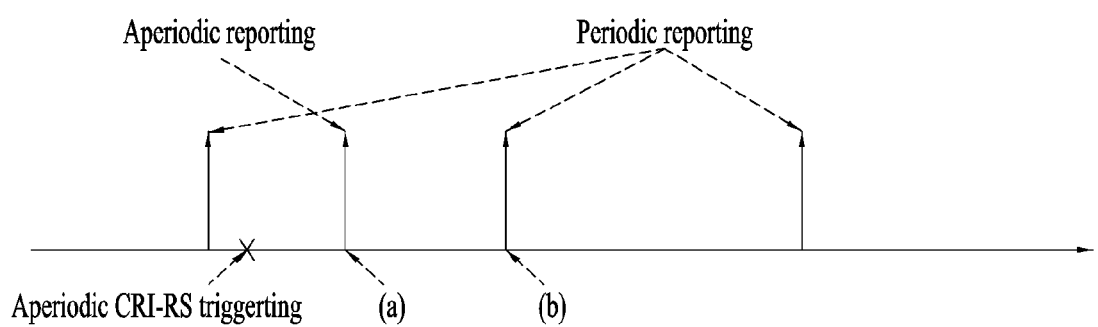

For example, as shown in FIG. 18, it is assumed that an aperiodic CSI-RS resource set in which an aperiodic CSI report is configured and a periodic CSI-RS resource set in which a periodic CSI report is configured constitute the integrated CSI-RS resource set and an aperiodic CSI reporting setting may be configured in a CSI reporting setting of the integrated CSI-RS resource set.

In this case, the UE may report a CSI (e.g., the best CRI or K best CRIs) for the integrated CSI-RS resource set to the BS at an aperiodic CSI reporting time indicated by (a) in FIG. 18. On the other hand, the UE may report only a CSI (e.g., the best CRI or K best CRIs) for a periodic CSI-RS resource set to the BS at a periodic CSI reporting time indicated by (b) in FIG. 18. The above operation may be indicated to or configured for the UE by the BS.

If the UE is configured to report N(>=1) {CRI/RSRP} sets and to report M(<=N) {PMI}, {RI/PMI}, or {RI/PMI/CQI} sets, the BS for CoMP scheduling may perform JT using a total of M beams among M TRPs or a plurality of TRPs and consider (N-M) beams as CoMP candidates although the (N-M) beams do not directly participate in JT at a current time. To this end, the UE may expect or assume that the UE is instructed or configured to report only a CRI/RSRP value for (N-M) CSI-RS resources and to report an RI/PMI/CQI value in addition to the CRI/RSRP value, for M CSI-RS resources.

On the other hand, when the UE is configured to report N {CRI/RSRP} sets and to report M(<N) {PMI}, {RI/PMI}, or {RI/PMI/CQI} sets and reports M best CRIs among the {PMI}, {RI/PMI}, or {RI/PMI/CQI} sets, the BS may not directly indicate indexes or IDs of M CSI-RS resources for reporting the RI/PMI/CQI to the UE. In this case, the UE may selectively report CSI-RS resources corresponding to the M best CRIs from among N CSI-RS resources. In this case, the BS may instruct or configure the UE to perform JT using M TRPs/beams and report only CRI/RSRP information using (N-M) TRPs/beams as CoMP candidates.

Figure 19:
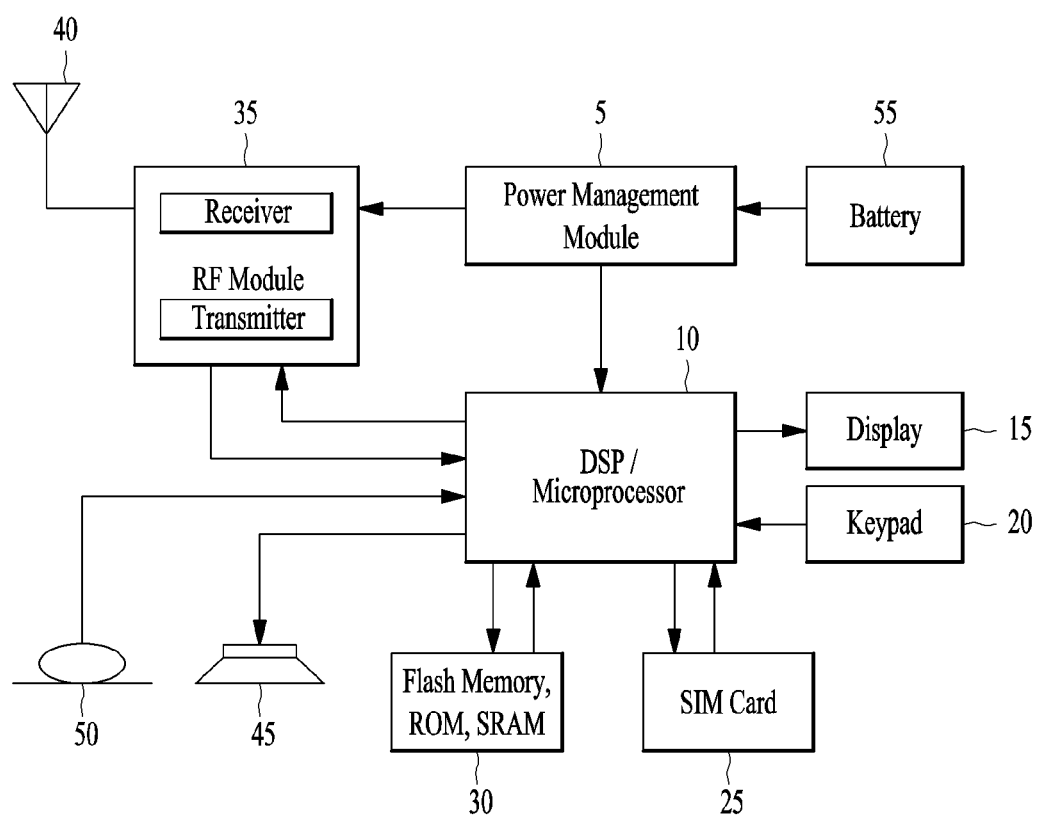
FIG. 19 is a block diagram illustrating components of a wireless device for implementing the present disclosure.

FIG. 19 illustrates an example of a wireless communication device according to an embodiment of the present disclosure.

The wireless communication device illustrated in FIG. 19 may represent a UE and/or a BS according to an embodiment of the present disclosure. However, the wireless communication device of FIG. 19 may be replaced with any of various types of devices such as a vehicle communication system or device, a wearable device, and a laptop, not limited to the UE and/or the BS according to the embodiment of the present disclosure. More specifically, the above device may be a BS, a network node, a Tx UE, an Rx UE, a wireless device, a wireless communication device, a vehicle, a vehicle having a self-driving function, an unmanned aerial vehicle (UAV), an artificial intelligence (AI) module, a robot, an augmented reality (AR) device, a virtual reality (VR) device, a machine-type communication (MTC) device, an Internet of things (IoT) device, a medical device, a FinTech device (or a financial device), a security device, a weather/environment device, or a device related to the fourth industrial revolution or a 5G service. The UAV may be, for example, an aircraft without a human being onboard, which aviates by a wireless control signal. The MTC device and the IoT device may be, for example, devices that do not require direct human intervention or manipulation and may include smartmeters, vending machines, thermometers, smartbulbs, door locks, or various sensors. The medical device may be, for example, a device used for the purpose of diagnosing, treating, relieving, curing, or preventing disease or a device used for the purpose of inspecting, replacing, or modifying a structure or a function and may include a device for treatment, a device for operation, a device for (in vitro) diagnosis, a hearing aid, or an operation device. The security device may be, for example, a device installed to prevent a danger that may arise and to maintain safety and may include a camera, a CCTV, or a black box. The FinTech device may be, for example, a device capable of providing a financial service such as mobile payment and may include a payment device or a point of sale (POS) system. The weather/environment device may be, for example, a device for monitoring or predicting a weather/environment.

The Tx UE or the Rx UE may include, for example, a cellular phone, a smartphone, a laptop computer, a digital broadcast terminal, a personal digital assistant (PDA), a portable multimedia player (PMP), a navigation system, a slate PC, a tablet PC, an ultrabook, a wearable device (e.g., a smartwatch, smartglasses, or a head mounted display (HMD)), or a foldable device. The HMD may be, for example, a type of display device that is worn on the head and may be used to implement VR or AR.

In the example of FIG. 19, the UE and/or the BS according to the embodiment of the present disclosure includes at least one processor 10 such as a digital signal processor or a microprocessor, a transceiver 35, a power management module 5, an antenna 40, a battery 55, a display 15, a keypad 20, a memory 30, a subscriber identity module (SIM) card 25, a speaker 45, and a microphone 50. In addition, the UE and/or the BS may include one or more antennas. The transceiver 35 may be also referred to as an RF module.

The at least one processor 10 may be configured to implement the functions, procedures and/or methods described with reference to FIGS. 1 to 18. In at least some of the embodiments described with reference to FIGS. 1 to 18, the at least one processor 10 may implement one or more protocols, such as layers of radio interface protocols (e.g., functional layers).

The memory 30 is coupled to the at least one processor 10 and stores information related to the operations of the at least one processor 10. The memory 30 may be located inside or outside the at least one processor 10 and may be coupled to the at least one processor 10 by various techniques such as wired or wireless communication.

A user may input various types of information (e.g., indication information such as a telephone number) by various techniques such as pressing a button on the keypad 20 or activating voice using the microphone 50. The at least one processor 10 executes appropriate functions such as receiving and/or processing information of the user and dialing a telephone number.

It is also possible to retrieve data (e.g., operational data) from the SIM card 25 or the memory 30 to execute the appropriate functions. In addition, the at least one processor 10 may receive and process global positioning system (GPS) information from a GPS chip to obtain location information about the UE and/or the BS such as in vehicle navigation, map service, or the like, or execute functions related to the location information. Further, the at least one processor 10 may display these various types of information and data on the display 15 for reference and user convenience.

The transceiver 35 is coupled to the at least one processor 10 to transmit and/or receive wireless signals such as RF signals. The at least one processor 10 may control the transceiver 35 to initiate communication and transmit wireless signals including various types of information or data, such as voice communication data. The transceiver 35 may include a receiver for receiving a wireless signal and a transmitter for transmitting a wireless signal. The antenna 40 facilitates the transmission and reception of wireless signals. In some embodiments, upon receipt of a wireless signal, the transceiver 35 may forward and convert the signal to a baseband frequency for processing by the at least one processor 10. The processed signal may be processed according to various techniques, such as being converted into audible or readable information, and output through the speaker 45.

In some embodiments, a sensor may also be coupled to the at least one processor 10. The sensor may include one or more sensing devices configured to detect various types of information, including velocity, acceleration, light, vibration, and the like. The at least one processor 10 receives and processes sensor information obtained from the sensor, such as proximity, position, image, and the like, thereby executing various functions such as collision avoidance and autonomous driving.

Various components such as a camera and a universal serial bus (USB) port may further be included in the UE and/or the BS. For example, a camera may further be coupled to the at least one processor 10, for use in various services including autonomous driving and vehicle safety services.

FIG. 19 merely illustrates one example of devices included in a UE and/or a BS, not limiting the present disclosure. For example, some components, such as the keypad 20, the GPS chip, the sensor, the speaker 45 and/or the microphone 50 may be excluded from UE and/or BS implementation in some embodiments.

Specifically, in order to implement embodiments of the present disclosure, an operation when the wireless communication device illustrated in FIG. 19 is the UE according to an embodiment of the present disclosure will now be described. When the wireless communication device is the UE according to an embodiment of the present disclosure, the processor 10 may configure a CSI-RS resource group, that corresponds to a CSI-RS resource set and/or a CSI-RS resource setting, and an integrated CSI-RS resource set, that is obtained by regrouping a plurality of CSI-RS resource groups. A detailed method of configuring the CSI-RS resource group and the integrated CSI-RS resource set may be based on Embodiment 1 described above.

The processor 10 may configure a CSI reporting setting associated with the CSI-RS resource group and a CSI reporting setting associated with the integrated CSI-RS resource set. A method of configuring the CSI reporting settings associated respectively with the CSI-RS resource group and the integrated CSI-RS resource set may be based on Embodiment 2 described above.

Next, the processor 10 may control the transceiver 35 to receive a CSI-RS based on configuration for the CSI-RS resource group and configuration for the integrated CSI-RS resource set and control the transceiver 35 to report CSI based on the CSI reporting settings associated respectively with the CSI-RS resource group and the integrated CSI-RS resource set. A method of reporting the CSI based on the CSI reporting settings associated respectively with the CSI-RS resource group and the integrated CSI-RS resource set, and reported CSI content may be based on Embodiment 2 described above.

In order to implement embodiments of the present disclosure, when the wireless communication device illustrated in FIG. 19 is the BS, the processor 10 may control the transceiver 35 to transmit information for configuring a CSI-RS resource group and information for configuring an integrated CSI-RS resource set to the UE. The information for configuring the CSI-RS resource group and the information for configuring the integrated CSI-RS resource set may be determined based on Embodiment 1 described above.

The processor 10 may control the transceiver 10 to transmit information about a CSI reporting setting associated with the CSI-RS resource group and information about a CSI reporting setting associated with the integrated CSI-RS resource set to the UE. The information about the CSI reporting setting associated with the CSI-RS resource group and the information about the CSI reporting setting associated with the integrated CSI-RS resource set may be determined based on Embodiment 2 described above.

The processor 10 may control the transceiver 35 to transmit CSI-RSs corresponding to the CSI-RS resource group and the integrated CSI-RS resource set to the UE and control the transceiver 35 to receive CSI about a measured CSI-RS resource group and CSI about the integrated CSI-RS resource set from the UE. A method of receiving the CSI reported based on the CSI reporting settings associated respectively with the CSI-RS resource group and the integrated CSI-RS resource set, and reported CSI content may be based on Embodiment 2 described above.

Figure 20:
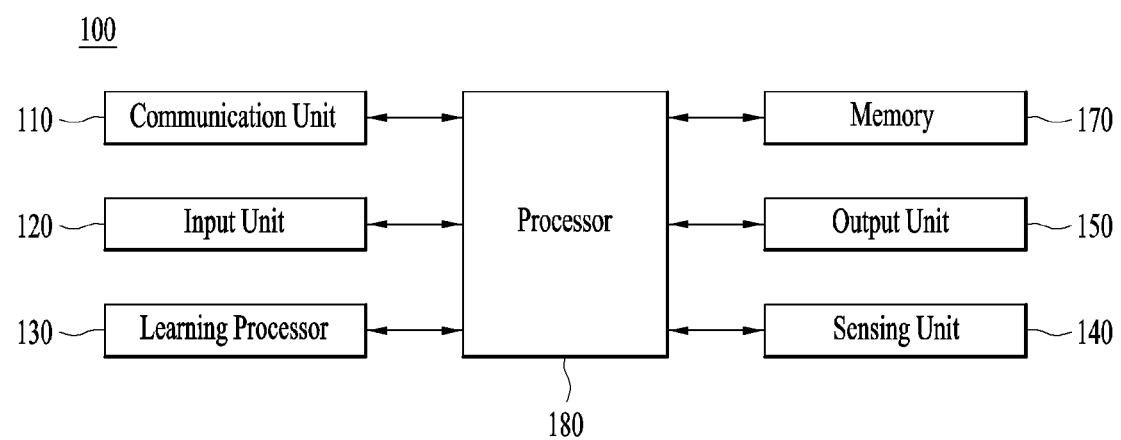
FIGS. 20, 21 and 22 are diagrams illustrating an AI apparatus and AI system according to an embodiment of the present disclosure.

FIG. 20 illustrates an AI device 100 according to an embodiment of the present disclosure.

The AI device 100 may be implemented by a stationary or mobile device, for example, a TV, a projector, a mobile phone, a smartphone, a desktop computer, a laptop computer, a digital broadcasting terminal, a personal digital assistant (PDA), a portable multimedia player (PMP), a navigation device, a tablet PC, a wearable device, a set-top box (STB), a digital multimedia broadcasting (DMB) receiver, a radio, a washing machine, a refrigerator, a desktop computer, a digital signage, a robot, a vehicle, etc.

Referring to FIG. 20, the AI device 100 may include a communication unit 110, an input unit 120, a learning processor 130, a sensing unit 140, an output unit 150, a memory 170, and a processor 180.

The communication unit 110 may transmit and receive data to and from external devices such as an AI server 200 and other AI devices 100a to 100e based on wired or wireless communication technology. For example, the communication unit 110 may transmit and receive sensor information, user inputs, learning models, and control signals to and from the external devices.

The communication technology used by the communication unit 110 includes Global System for Mobile communication (GSM), Code Division Multiple Access (CDM), Long Term Evolution (LTE), 5G, Wireless Local Area Network (WLAN), Wireless Fidelity (Wi-Fi), Bluetooth™, Radio Frequency Identification (RFID), Infrared Data Association (IrDA), ZigBee, Near Field Communication (NFC), etc.

The input unit 120 may obtain various types of data.

The input unit 120 may include a camera for inputting a video signal, a microphone for receiving an audio signal, and a user input unit for receiving information from a user. The camera or microphone may be treated as a sensor, and the signal obtained from the camera or microphone may be considered as sensing data or sensor information.

The input unit 120 may obtain learning data for a learning model and input data to be used when an output is obtained based on the learning model. The input unit 120 may obtain raw input data. In this case, the processor 180 or learning processor 130 may extract an input feature by preprocessing the input data.

The learning processor 130 may train a model configured with an ANN based on the learning data. Here, the trained ANN may be referred to as the learning model. The learning model may be used to infer a result value for new input data rather than the learning data, and the inferred value may be used as a basis for determining whether to perform a certain operation.

In this case, the learning processor 130 may perform AI processing together with a learning processor 240 of the AI server 200.

The learning processor 130 may include a memory integrated with or implemented in the AI device 100. Alternatively, the learning processor 130 may be implemented with the memory 170, an external memory directly coupled to the AI device 100, or a memory in an external device.

The sensing unit 140 may obtain at least one of internal information of the AI device 100, surrounding environment information of the AI device 100, and user information using various sensors.

The sensor included in the sensing unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a LIDAR, a radar, and the like.

The output unit 150 may generate an output related to visual, audible, or tactile sense.

The output unit 150 may include a display unit for outputting visual information, a speaker for outputting audible information, a haptic module for outputting tactile information, and the like.

The memory 170 may store data supporting various functions of the AI device 100. For example, the memory 170 may store input data, learning data, learning models, learning histories, etc. obtained by the input unit 120.

The processor 180 may determine at least one executable operation of the AI device 100 based on information determined or generated by a data analysis algorithm or machine learning algorithm. The processor 180 may control the components of the AI device 100 to perform the determined operation.

To this end, the processor 180 may request, search for, receive, or employ data of the learning processor 130 or memory 170 and control the components of the AI device 100 to execute an expected or preferable operation or among the one or more executable operations.

If the processor 180 requires association with an external device to perform the determined operation, the processor 180 may generate a control signal for controlling the corresponding external device and transmit the generated control signal to the external device.

The processor 180 may obtain intention information from a user input and determine the intention of the user based on the obtained intention information.

In this case, the processor 180 may obtain the intention information corresponding to the user input using at least one of a speech-to-text (STT) engine for converting a voice input into a character string or a natural language processing (NLP) engine for obtaining intention information from a natural language.

At least one of the STT engine and the NLP engine may be configured with the ANN of which at least a part is trained according to the machine learning algorithm. At least one of the STT engine and the NLP engine may be trained by the learning processor 130, by the learning processor 240 of the AI server 200, or by distributed processing thereof.

The processor 180 may collect history information including user feedback on the operation of the AI device 100 and details thereof. The processor 180 may store the history information in the memory 170 or learning processor 130 or transmit the history information to an external device such as the AI server 200. The collected history information may be used to update the learning model.

The processor 180 may control at least some of the components of the AI device 100 to drive an application program stored in the memory 170. Further, the processor 180 may operate two or more of the components included in the AI device 100 in combination to drive the application program.

Figure 21:
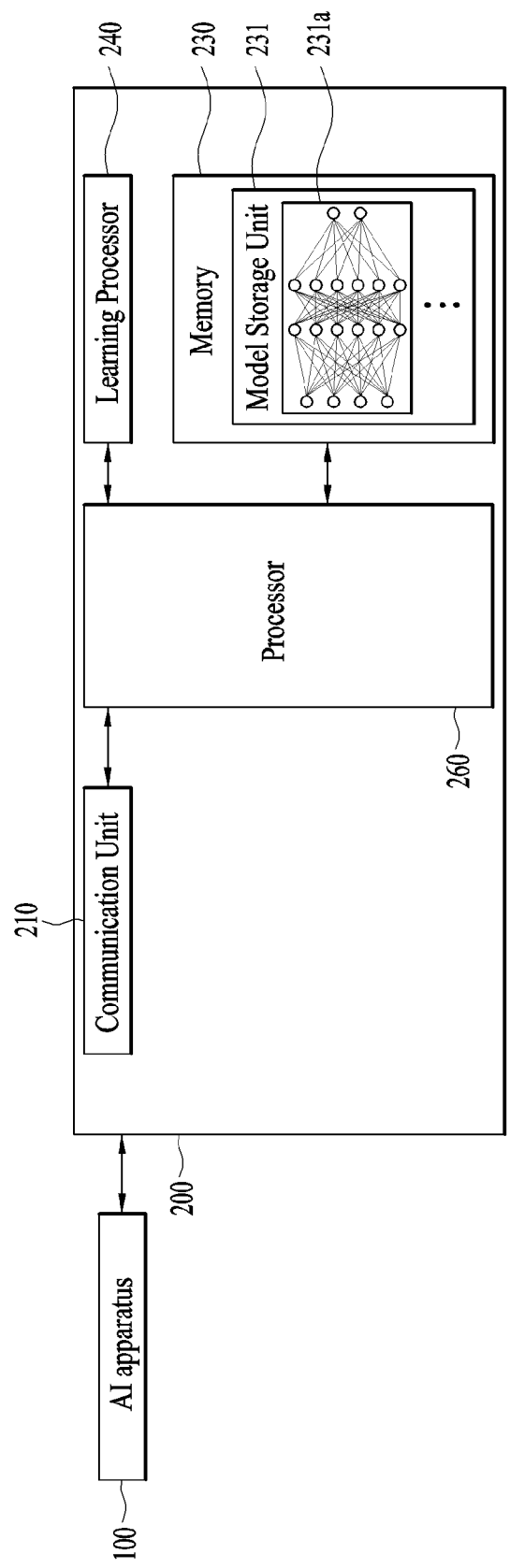

FIG. 21 illustrates the AI server 200 according to an embodiment of the present disclosure.

Referring to FIG. 21, the AI server 200 may mean a device for training an ANN based on a machine learning algorithm or a device for using a trained ANN. Here, the AI server 200 may include a plurality of servers to perform distributed processing or may be defined as a 5G network. The AI server 200 may be included as a part of the AI device 100 to perform at least part of AI processing together.

The AI server 200 may include a communication unit 210, a memory 230, the learning processor 240, a processor 260, and the like.

The communication unit 210 may transmit and receive data to and from an external device such as the AI device 100.

The memory 230 may include a model storage unit 231. The model storage unit 231 may store a model being trained or trained (or an ANN 231a) through the learning processor 240.

The learning processor 240 may train the ANN 231a based on learning data. The ANN, i.e., a learning model may be included in the AI server 200 or in an external device such as the AI device 100.

The learning model may be implemented by hardware, software or a combination thereof. If a part or the entirety of the learning model is implemented with software, one or more instructions for the learning model may be stored in the memory 230.

The processor 260 may infer a result value for new input data based on the learning model and generate a response or control command based on the inferred result value.

Figure 22:
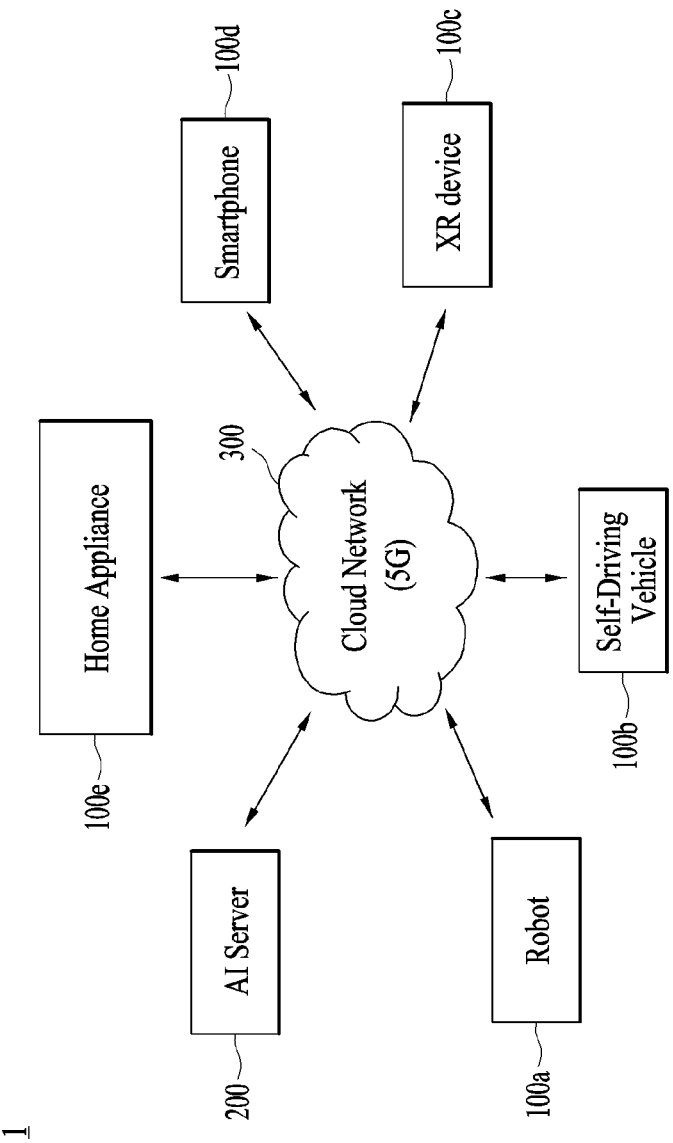

FIG. 22 illustrates an AI system 1 according to an embodiment of the present disclosure.

Referring to FIG. 22, at least one of the AI server 200, a robot 100a, an autonomous driving vehicle 100b, an XR device 100c, a smartphone 100d, and a home appliance 100e is connected to a cloud server 10 in the AI system 1. Here, the robot 100a, the autonomous vehicle 100b, the XR device 100c, the smartphone 100d, or the home appliance 100e, to which the AI technology is applied, may be referred to as an AI device 100a to 100e.

The cloud network 10 may refer to a network configuring part of a cloud computing infrastructure or a network existing in the cloud computing infrastructure. Here, the cloud network 10 may be configured with a 3G network, a 4G or LTE network, or a 5G network.

That is, each of the devices 100a to 100e and 200 included in the AI system 1 may be connected to each other through the cloud network 10. In particular, the devices 100a to 100e and 200 may communicate with each other through a BS or may communicate with each other directly without the BS.

The AI server 200 may include a server in charge of AI processing and a server in charge of big data computation.

The AI server 200 may be connected to at least one of the robot 100a, the autonomous vehicle 100b, the XR device 100c, the smartphone 100d, or the home appliance 100e included in the AI system 1 via the cloud network 10 and help at least part of AI processing of the connected AI devices 100a to 100e.

In this case, the AI server 200 may train an ANN according to a machine learning algorithm on behalf of the AI devices 100a to 100e and directly store or transmit a learning model to the AI devices 100a to 100e.

The AI server 200 may receive input data from the AI devices 100a to 100e, infer a result value for the received input data based on the learning model, generate a response or control command based on the inferred result value, and transmit the response or control command to the AI devices 100a to 100e.

Alternatively, the AI devices 100a to 100e may directly infer the result value for the input data based on the learning model and generate the response or control command based on the inferred result value.

Hereinafter, various embodiments of the AI devices 100a to 100e to which the above-described technology is applied will be described. The AI devices 100a to 100e illustrated in FIG. 22 may be considered as a specific example of the AI device 100 illustrated in FIG. 20.

<AI+Robot>

If the AI technology is applied to the robot 100a, the robot 100a may be implemented as a guide robot, a transport robot, a cleaning robot, a wearable robot, an entertainment robot, a pet robot, an unmanned flying robot, etc.

The robot 100*a* may include a robot control module for controlling an operation, and the robot control module may refer to a software module or a chip implemented by hardware.

The robot 100*a* may obtain state information of the robot 100*a*, detect (recognize) a surrounding environment and objects, generate map data, determine a travel route or driving plan, or determine a response or action to user interaction by using sensor information obtained from various types of sensors.

To determine the travel route or driving plan, the robot 100*a* may use sensor information obtained from at least one of the following sensors: a LIDAR, a radar, and a camera to determine a movement route and a travel plan.

The robot 100*a* may perform the above-described operations based on a learning model configured with at least one ANN. For example, the robot 100*a* may recognize the surrounding environment and objects based on the learning model and determine an operation based on the recognized surrounding environment or object. Here, the learning model may be directly trained by the robot 100*a* or by an external device such as the AI server 200.

The robot 100*a* may operate by directly generating a result based on the learning model. Alternatively, the robot 100*a* may transmit sensor information to the external device such as the AI server 200 and receive a result generated based on the sensor information.

The robot 100*a* may determine the travel route and driving plan based on at least one of the map data, the object information detected from the sensor information, or the object information obtained from the external device. Then, the robot 100*a* may move according to the determined travel path and driving plan under control of its driving unit.

The map data may include object identification information about various objects placed in a space in which the robot 100*a* moves. For example, the map data may include object identification information about fixed objects such as walls and doors and movable objects such as flower pots and desks. The object identification information may include a name, a type, a distance, a position, etc.

The robot 100*a* may operate and move by controlling the driving unit based on the user control/interaction. In this case, the robot 100*a* may obtain intention information from the motion or speech of the user and determine a response based on the obtained intention information.

<AI+Autonomous Driving>

If the AI technology is applied to the autonomous driving vehicle 100*b*, the autonomous driving vehicle 100*b* may be implemented as a mobile robot, a vehicle, an unmanned flying vehicle, etc.

The autonomous driving vehicle 100*b* may include an autonomous driving control module for controlling the autonomous driving function, and the autonomous driving control module may refer to a software module or a chip implemented by hardware. The autonomous driving control module may be included in the autonomous driving vehicle 100*b* as a component thereof, but it may be implemented with separate hardware and connected to the outside of the autonomous driving vehicle 100*b*.

The autonomous driving vehicle 100*b* may obtain state information about the autonomous driving vehicle 100*b* based on sensor information acquired from various types of sensors, detect (recognize) a surrounding environment and objects, generate map data, determine a travel route and driving plan, or determine an operation.

Similarly to the robot 100*a*, the autonomous driving vehicle 100*b* may use the sensor information obtained from at least one of the following sensors: a LIDAR, a radar, and a camera so as to determine the travel route and driving plan.

In particular, the autonomous driving vehicle 100*b* may recognize an environment and objects in an area hidden from view or an area over a certain distance by receiving the sensor information from external devices. Alternatively, the autonomous driving vehicle 100*b* may receive information, which is recognized by the external devices.

The autonomous driving vehicle 100*b* may perform the above-described operations based on a learning model configured with at least one ANN. For example, the autonomous driving vehicle 100*b* may recognize the surrounding environment and objects based on the learning model and determine the driving path based on the recognized surrounding environment and objects. The learning model may be trained by the autonomous driving vehicle 100*a* or an external device such as the AI server 200.

The autonomous driving vehicle 100*b* may operate by directly generating a result based on the learning model. Alternatively, the autonomous driving vehicle 100*b* may transmit sensor information to the external device such as the AI server 200 and receive a result generated based on the sensor information.

The autonomous driving vehicle 100*b* may determine the travel route and driving plan based on at least one of the map data, the object information detected from the sensor information, or the object information obtained from the external device. Then, the autonomous driving vehicle 100*b* may move according to the determined travel path and driving plan under control of its driving unit.

The map data may include object identification information about various objects placed in a space (e.g., road) in which the autonomous driving vehicle 100*b* moves. For example, the map data may include object identification information about fixed objects such as street lamps, rocks, and buildings and movable objects such as vehicles and pedestrians. The object identification information may include a name, a type, a distance, a position, etc.

The autonomous driving vehicle 100*b* may operate and move by controlling the driving unit based on the user control/interaction. In this case, the autonomous driving vehicle 100*b* may obtain intention information from the motion or speech of a user and determine a response based on the obtained intention information.

<AI+XR>

When the AI technology is applied to the XR device 100*c*, the XR device 100*c* may be implemented as a HMD, a HUD mounted in vehicles, a TV, a mobile phone, a smartphone, a computer, a wearable device, a home appliance, a digital signage, a vehicle, a fixed robot, a mobile robot, etc.

The XR device 100*c* may analyze three-dimensional point cloud data or image data obtained from various sensors or external devices, generate position data and attribute data for three-dimensional points, obtain information about a surrounding environment or information about a real object, perform rendering to on an XR object, and then output the XR object. For example, the XR device 100*c* may output an XR object including information about a recognized object, that is, by matching the XR object with the recognized object.

The XR device 100*c* may perform the above-described operations based on a learning model configured with at least one ANN. For example, the XR device 100*c* may recognize the real object from the three-dimensional point cloud data or image data based on the learning model and provide information corresponding to the recognized real object. The learning model may be directly trained by the XR device 100c or an external device such as the AI server 200.

The XR device 100c may operate by directly generating a result based on the learning model. Alternatively, the XR device 100c may transmit sensor information to the external device such as the AI server 200 and receive a result generated based on the sensor information.

<AI+Robot+Autonomous Driving>

When the AI technology and the autonomous driving technology are applied to the robot 100a, the robot 100a may be implemented as a guide robot, a transport robot, a cleaning robot, a wearable robot, an entertainment robot, a pet robot, an unmanned flying robot, etc.

The robot 100a to which the AI technology and the autonomous driving technology are applied may refer to the robot 100a with the autonomous driving function or the robot 100a interacting with the autonomous driving vehicle 100b.

The robot 100a having the autonomous driving function may be collectively referred to as a device that move along a given movement path without human control or a device that moves by autonomously determining its movement path.

The robot 100a having the autonomous driving function and the autonomous driving vehicle 100b may use a common sensing method to determine either a travel route or a driving plan. For example, the robot 100a having the autonomous driving function and the autonomous driving vehicle 100b may determine either the travel route or the driving plan based on information sensed through a LIDAR, a radar, and a camera.

The robot 100a interacting with the autonomous driving vehicle 100b may exist separately from with the autonomous driving vehicle 100b. That is, the robot 100a may perform operations associated with the autonomous driving function inside or outside the autonomous driving vehicle 100b or interwork with a user on the autonomous driving vehicle 100b.

The robot 100a interacting with the autonomous driving vehicle 100b may control or assist the autonomous driving function of the autonomous driving vehicle 100b by obtaining sensor information on behalf of the autonomous driving vehicle 100b and providing the sensor information to the autonomous driving vehicle 100b or by obtaining sensor information, generating environment information or object information, and providing the information to the autonomous driving vehicle 100b.

Alternatively, the robot 100a interacting with the autonomous driving vehicle 100b may monitor the user on the autonomous driving vehicle 100b or control the autonomous driving vehicle 100b through the interaction with the user. For example, when it is determined that the driver is in a drowsy state, the robot 100a may activate the autonomous driving function of the autonomous driving vehicle 100b or assist the control of the driving unit of the autonomous driving vehicle 100b. The function of the autonomous driving vehicle 100b controlled by the robot 100a may include not only the autonomous driving function but also functions installed in the navigation system or audio system provided in the autonomous driving vehicle 100b.

Alternatively, the robot 100a interacting with the autonomous driving vehicle 100b may provide information to the autonomous driving vehicle 100b outside the autonomous driving vehicle 100b or assist the autonomous driving vehicle 100b outside the autonomous driving vehicle 100b. For example, the robot 100a may provide traffic information including signal information such as smart traffic lights to the autonomous driving vehicle 100b or automatically connect an electric charger to a charging port by interacting with the autonomous driving vehicle 100b like an automatic electric charger installed in an electric vehicle.

<AI+Robot+XR>

When the AI technology and the XR technology are applied to the robot 100a, the robot 100a may be implemented as a guide robot, a transport robot, a cleaning robot, a wearable robot, an entertainment robot, a pet robot, an unmanned flying robot, a drone, etc.

The robot 100a to which the XR technology is applied may refer to a robot subjected to control/interaction in an XR image. In this case, the robot 100a may be separated from the XR device 100c but interact with the XR device 100c.

When the robot 100a subjected to control/interaction in the XR image obtains sensor information from sensors including a camera, the robot 100a or XR device 100c may generate the XR image based on the sensor information, and then the XR device 100c may output the generated XR image. The robot 100a may operate based on a control signal input through the XR device 100c or user interaction.

For example, a user may confirm the XR image corresponding to the perspective of the robot 100a remotely controlled through an external device such as the XR device 100c. Then, the user may adjust the autonomous driving path of the robot 100a or control the operation or movement of the robot 100a through interaction therewith or check information about surrounding objects.

<AI+Autonomous Driving+XR>

When the AI technology and the XR technology is applied to the autonomous driving vehicle 100b, the autonomous driving vehicle 100b may be implemented as a mobile robot, a vehicle, an unmanned flying vehicle, etc.

The autonomous driving vehicle 100b to which the XR technology is applied may refer to an autonomous driving vehicle capable of providing an XR image or an autonomous driving vehicle subjected to control/interaction in an XR image. In particular, the autonomous driving vehicle 100b subjected to control/interaction in the XR image may be separated from the XR device 100c but interact with the XR device 100c.

The autonomous driving vehicle 100b capable of providing the XR image may obtain sensor information from sensors including a camera and output the generated XR image based on the obtained sensor information. For example, the autonomous driving vehicle 100b may include an HUD for outputting an XR image, thereby providing a user with an XR object corresponding to an object in the screen together with a real object.

When the XR object is displayed on the HUD, at least part of the XR object may overlap with the real object which the user looks at. On the other hand, when the XR object is displayed on a display provided in the autonomous driving vehicle 100b, at least part of the XR object may overlap with the object in the screen. For example, the autonomous driving vehicle 100b may output XR objects corresponding to objects such as a lane, another vehicle, a traffic light, a traffic sign, a two-wheeled vehicle, a pedestrian, a building, etc.

When the autonomous driving vehicle 100b subjected to control/interaction in the XR image may obtain the sensor information from the sensors including the camera, the autonomous driving vehicle 100b or the XR device 100c may generate the XR image based on the sensor information, and then the XR device 100c may output the generated XR image. The autonomous driving vehicle 100b may operate based on a control signal input through an external device such as the XR device 100c or user interaction.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'mobile station (MS)', 'mobile subscriber station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

While the above-described method of reporting CSI and the apparatus therefor have been described based on an example applied to a 5G NR system, the method and apparatus may be applied to various wireless communication systems in addition to the 5G NR system.

The invention claimed is:

1. A method of reporting channel state information (CSI) by a user equipment (UE) in a wireless communication system, the method comprising:
receiving first information related to an integrated CSI-reference signal (RS) resource set including a plurality of CSI-RS resource sets,
wherein each of the plurality of CSI-RS resource sets includes a plurality of CSI-RS resources, and
wherein a time domain behavior of each of the plurality of CSI-RS resources is set to one of aperiodic, periodic and semi-persistent;
receiving second information related to a plurality of CSI reporting settings,
wherein a first CSI reporting setting of the plurality of CSI reporting settings is associated with (i) the integrated CSI-RS resource set and (ii) a first CSI-RS resource set of the plurality of CSI-RS resource sets, and
wherein second CSI-RS resource set of the plurality of CSI-RS resource set is associated with a second CSI reporting setting of the plurality of CSI reporting settings;
measuring first Reference Signal Received Powers (RSRPs) of first CSI-RS resources included in the first CSI-RS resource set;
measuring second Reference Signal Received Powers (RSRPs) of second CSI-RS resources included in the second CSI-RS resource set;
reporting CSI of the integrated CSI-RS resource set based on the first CSI reporting setting based on a highest RSRP of first RSRPs being lower than a threshold value; and
reporting CSIs of the second CSI-RS resource sets based on the second CSI reporting setting based on a highest RSRP of second RSRPs being higher than the threshold value,
wherein reporting of CSI of the first CSI resource set is skipped, and
wherein the plurality of CSI-RS resource sets included in the integrated CSI-RS resource set have the same ratio of CSI-RS power to Physical Downlink Shared Channel (PDSCH) power.

2. The method of claim 1,
wherein each of the plurality of CSI-RS resource sets is associated with a different base station (BS).

3. The method of claim 2,
wherein CSI-RS resource sets associated with BSs for which coordinated multiple point (CoMP) transmission is not scheduled among the plurality of CSI-RS resource sets are used for measuring a CSI-RS resource indicator (CRI) value and a reference signal received power (RSRP) value.

4. The method of claim 3,
wherein CSI-RS resource sets associated with BSs for which CoMP transmission is scheduled among the plurality of CSI-RS resource sets are used for determining the CRI value, the RSRP value, and a precoding matrix indicator (PMI).

5. The method of claim 1,
wherein the UE is communicable with at least one of another UE, a network, a base station (BS), or a self-driving vehicle.

6. An apparatus for reporting channel state information (CSI) in a wireless communication system, the apparatus comprising:

at least one processor; and at least one computer memory operably connectable to the at least one processor and storing instructions that, when executed by the at least one processor, perform operations comprising:

receiving first information related to an integrated CSI-reference signal (RS) resource set including a plurality of CSI-RS resource sets, wherein each of the plurality of CSI-RS resource sets includes a plurality of CSI-RS resources, and wherein a time domain behavior of each of the plurality of CSI-RS resources is set to one of aperiodic, periodic and semi-persistent, receiving second information related to a plurality of CSI reporting settings, wherein a first CSI reporting setting of the plurality of CSI reporting settings is associated with (i) the integrated CSI-RS resource set and (ii) a first CSI-RS resource set of the plurality of CSI-RS resource sets, and wherein second CSI-RS resource set of the plurality of CSI-RS resource set is associated with a second CSI reporting setting of the plurality of CSI reporting settings;

measuring first Reference Signal Received Powers (RSRPs) of first CSI-RS resources included in the first CSI-RS resource set;

measuring second Reference Signal Received Powers (RSRPs) of second CSI-RS resources included in the second CSI-RS resource set;

reporting CSI of the integrated CSI-RS resource set based on the first CSI reporting setting based on a highest RSRP of first RSRPs being lower than a threshold value; and reporting CSIs of the second CSI-RS resource sets based on the second CSI reporting setting based on a highest RSRP of second RSRPs being higher than the threshold value, wherein reporting of CSI of the first CSI resource set is skipped, and wherein the plurality of CSI-RS resource sets included in the integrated CSI-RS resource set have the same ratio of CSI-RS power to Physical Downlink Shared Channel (PDSCH) power.

7. The apparatus of claim 6,
wherein each of the plurality of CSI-RS resource sets is associated with a different base station (BS).

8. The apparatus of claim 7,
wherein CSI-RS resource sets associated with BSs for which coordinated multiple point (CoMP) transmission is not scheduled among the plurality of CSI-RS resource sets are used for measuring a CSI-RS resource indicator (CRI) value and a reference signal received power (RSRP) value.

9. The apparatus of claim 8,
wherein CSI-RS resource sets associated with BSs for which CoMP transmission is scheduled among the plurality of CSI-RS resource sets are used for determining the CRI value, the RSRP value, and a precoding matrix indicator (PMI).

10. The apparatus of claim 6,
wherein the apparatus is communicable with at least one of a user equipment (UE), a network, a base station (BS), or a self-driving vehicle other than the apparatus.

11. A user equipment (UE) for reporting channel state information (CSI) in a wireless communication system, the UE comprising:

at least one transceiver;

at least one processor; and at least one computer memory operably connectable to the at least one processor and storing instructions that, when executed by the at least one processor, perform operations comprising:

receiving, through the at least one transceiver, first information related to an integrated CSI-reference signal (RS) resource set including a plurality of CSI-RS resource sets, wherein each of the plurality of CSI-RS resource sets includes a plurality of CSI-RS resources, and wherein a time domain behavior of each of the plurality of CSI-RS resources is set to one of aperiodic, periodic and semi-persistent, receiving, through the at least one transceiver, second information related to a plurality of CSI reporting settings, wherein a first CSI reporting setting of the plurality of CSI reporting settings is associated with (i) the integrated CSI-RS resource set and (ii) a first CSI-RS resource set of the plurality of CSI-RS resource sets, and wherein second CSI-RS resource set of the plurality of CSI-RS resource set is associated with a second CSI reporting setting of the plurality of CSI reporting settings;

measuring first Reference Signal Received Powers (RSRPs) of first CSI-RS resources included in the first CSI-RS resource set;

measuring second Reference Signal Received Powers (RSRPs) of second CSI-RS resources included in the second CSI-RS resource set;

reporting CSI of the integrated CSI-RS resource set based on the first CSI reporting setting based on a highest RSRP of first RSRPs being lower than a threshold value; and reporting CSIs of the second CSI-RS resource sets based on the second CSI reporting setting based on a highest RSRP of second RSRPs being higher than the threshold value, wherein reporting of CSI of the first CSI resource set is skipped, and wherein the plurality of CSI-RS resource sets included in the integrated CSI-RS resource set have the same ratio of CSI-RS power to Physical Downlink Shared Channel (PDSCH) power.

* * * * *